(12) United States Patent
Purta et al.

(10) Patent No.: US 7,518,092 B2
(45) Date of Patent: Apr. 14, 2009

(54) PROCESSING APPARATUS WITH AN ELECTROMAGNETIC LAUNCH

(75) Inventors: David A. Purta, Gibsonia, PA (US); Marc A. Portnoff, Pittsburgh, PA (US)

(73) Assignee: Capital Technologies, Inc., Pittsburgh, PA (US)

( * ) Notice: Subject to any disclaimer, the term of this patent is extended or adjusted under 35 U.S.C. 154(b) by 0 days.

(21) Appl. No.: 11/686,586

(22) Filed: Mar. 15, 2007

(65) Prior Publication Data
US 2008/0233020 A1 Sep. 25, 2008

(51) Int. Cl.
*H05B 6/70* (2006.01)
*A61L 2/00* (2006.01)

(52) U.S. Cl. ........................................ 219/695; 422/21

(58) Field of Classification Search ......... 219/678–697; 422/21
See application file for complete search history.

(56) References Cited

U.S. PATENT DOCUMENTS

| | | | |
|---|---|---|---|
| 3,590,202 A | 6/1971 | Day et al. | |
| 4,234,402 A | 11/1980 | Kirkbride | |
| 4,778,969 A | 10/1988 | Le Viet | |
| 4,853,507 A | 8/1989 | Samardzija | |
| 4,934,561 A | 6/1990 | Ness et al. | |
| 4,967,486 A | 11/1990 | Doelling | |
| 5,152,074 A * | 10/1992 | Kishi | 34/247 |
| 5,374,413 A | 12/1994 | Kim et al. | |
| 5,382,412 A | 1/1995 | Kim et al. | |
| 5,417,941 A * | 5/1995 | McNulty | 422/307 |
| 5,536,921 A | 7/1996 | Hedrick et al. | |
| 5,719,380 A | 2/1998 | Coopes et al. | |
| 5,869,817 A | 2/1999 | Zietlow et al. | |
| 5,911,885 A | 6/1999 | Owens | |
| 5,914,014 A | 6/1999 | Kartchner | |
| 6,020,579 A * | 2/2000 | Lewis et al. | 219/696 |
| 6,037,911 A * | 3/2000 | Brankovic et al. | 343/795 |
| 6,043,608 A | 3/2000 | Samukawa et al. | |

(Continued)

FOREIGN PATENT DOCUMENTS

EP 1018856 1/2000

(Continued)

OTHER PUBLICATIONS

ETC Larry D. Simmons and ETC Floyd L. Ace III, Electronics Technician, vol. 7—Antennas and Wave Propagation Navedtra 14092, Oct. 1995, vol. 7, Naval Education and Training Professional Development and Technology Center.

(Continued)

*Primary Examiner*—Daniel L Robinson
(74) *Attorney, Agent, or Firm*—Michael Best & Friedrich LLP

(57) ABSTRACT

A processing apparatus, such as a microwave-based processing apparatus. The apparatus includes a vessel having an inner surface defining a chamber configured to hold a reaction mixture, a guide, and a launch coupled to the guide. The guide can be at least partially disposed in the vessel, and is configured to propagate electromagnetic energy. The launch is configured to couple at least a portion of the electromagnetic energy from the guide to the reaction mixture. Example launches include a dielectric window and a projection. Example projections include a metallic projection and a dielectric projection.

45 Claims, 18 Drawing Sheets

U.S. PATENT DOCUMENTS

| | | | |
|---|---|---|---|
| 6,077,400 | A | 6/2000 | Kartchner |
| 6,086,830 | A | 7/2000 | Kartchner |
| 6,097,015 | A | 8/2000 | McCulough et al. |
| 6,121,595 | A * | 9/2000 | Lewis et al. ............ 219/695 |
| 6,175,104 | B1 * | 1/2001 | Greene et al. ............ 219/679 |
| 6,184,427 | B1 | 2/2001 | Klepfer et al. |
| 6,198,460 | B1 * | 3/2001 | Brankovic ............ 343/879 |
| 6,242,723 | B1 | 6/2001 | Lautenschlager |
| 6,246,039 | B1 | 6/2001 | Omori et al. |
| 6,268,596 | B1 | 7/2001 | Lauf et al. |
| 6,274,058 | B1 | 8/2001 | Rajagopalan et al. |
| 6,294,772 | B1 * | 9/2001 | Greene et al. ............ 219/679 |
| 6,346,693 | B1 | 2/2002 | Kasevich |
| 6,376,817 | B1 * | 4/2002 | McFadden et al. ........ 219/681 |
| 6,403,939 | B1 | 6/2002 | Fagrell |
| 6,451,174 | B1 | 9/2002 | Burkitbaev |
| 6,496,736 | B1 | 12/2002 | Carl et al. |
| 6,614,010 | B2 | 9/2003 | Fagrell et al. |
| 6,630,654 | B2 | 10/2003 | Fagrell et al. |
| 6,674,054 | B2 | 1/2004 | Boyers |
| 6,740,858 | B2 | 5/2004 | Tracy et al. |
| 6,744,802 | B1 | 6/2004 | Ohmi et al. |
| 6,790,547 | B2 | 9/2004 | Dieckmann et al. |
| 6,867,400 | B2 | 3/2005 | Collins et al. |
| 6,917,022 | B2 | 7/2005 | Feher et al. |
| 6,933,482 | B2 | 8/2005 | Fagrell et al. |
| 6,960,747 | B2 | 11/2005 | Risman |
| 6,988,026 | B2 | 1/2006 | Breed et al. |
| 7,026,588 | B2 | 4/2006 | Demotte et al. |
| 7,098,671 | B2 | 8/2006 | Bassali et al. |
| 7,109,453 | B1 | 9/2006 | Nadolski |
| 2002/0070174 | A1 | 6/2002 | Purta et al. |
| 2002/0190061 | A1 | 12/2002 | Gerdes et al. |
| 2004/0074759 | A1 | 4/2004 | Purta et al. |
| 2004/0074760 | A1 | 4/2004 | Portnoff et al. |
| 2004/0077485 | A1 | 4/2004 | Purta et al. |
| 2005/0274065 | A1 | 12/2005 | Portnoff et al. |
| 2006/0102622 | A1 | 5/2006 | Gregoire et al. |
| 2006/0124635 | A1 | 6/2006 | Risman |
| 2006/0151485 | A1 | 7/2006 | Cronin |
| 2006/0196871 | A1 | 9/2006 | Risman |
| 2007/0056880 | A1 | 3/2007 | Moreira et al. |
| 2007/0068937 | A1 | 3/2007 | Risman |
| 2007/0079522 | A1 | 4/2007 | Kimrey |
| 2007/0079523 | A1 | 4/2007 | Kimrey |

FOREIGN PATENT DOCUMENTS

| | | |
|---|---|---|
| WO | 03/014272 | 2/2003 |

OTHER PUBLICATIONS

Cheng, David K. and Wesley, Addison, Chapter 10 Waveguides and Cavity Resonators, Field and Wave Electromagnetics, 1992, 37 pages.

Roussy, G. and Pearce, J.A., Foundations and Industrial Applications of Microwave and Radio Frequency Fields, Chapter 4, Section 4.2.3, 1995, 5 pages, John Wiley and Sons, New York.

Meredith, Roger, Engineers Handbook of Industrial Microwave Heating, Chapters 5, 6 and 7, 1998, 73 pages, Institution of Electrical Engineers, London.

Berdonosov, S.S., "Microvolnovaya Khimiya (Microwave Chemistry)," Sorosovsky obrazovatelny zhurnal (2001) 7 (1):32-38 English Translation.

Loupy, A., "Solvent-free reactions," Topics in Current Chemistry (1999) 206:153-207.

* cited by examiner

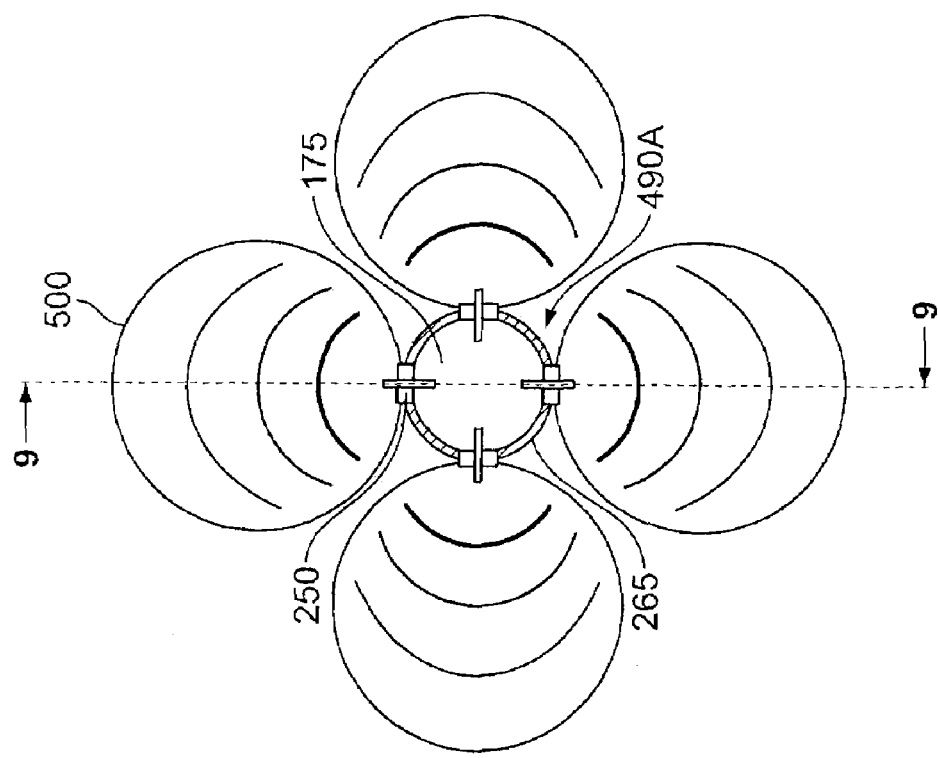
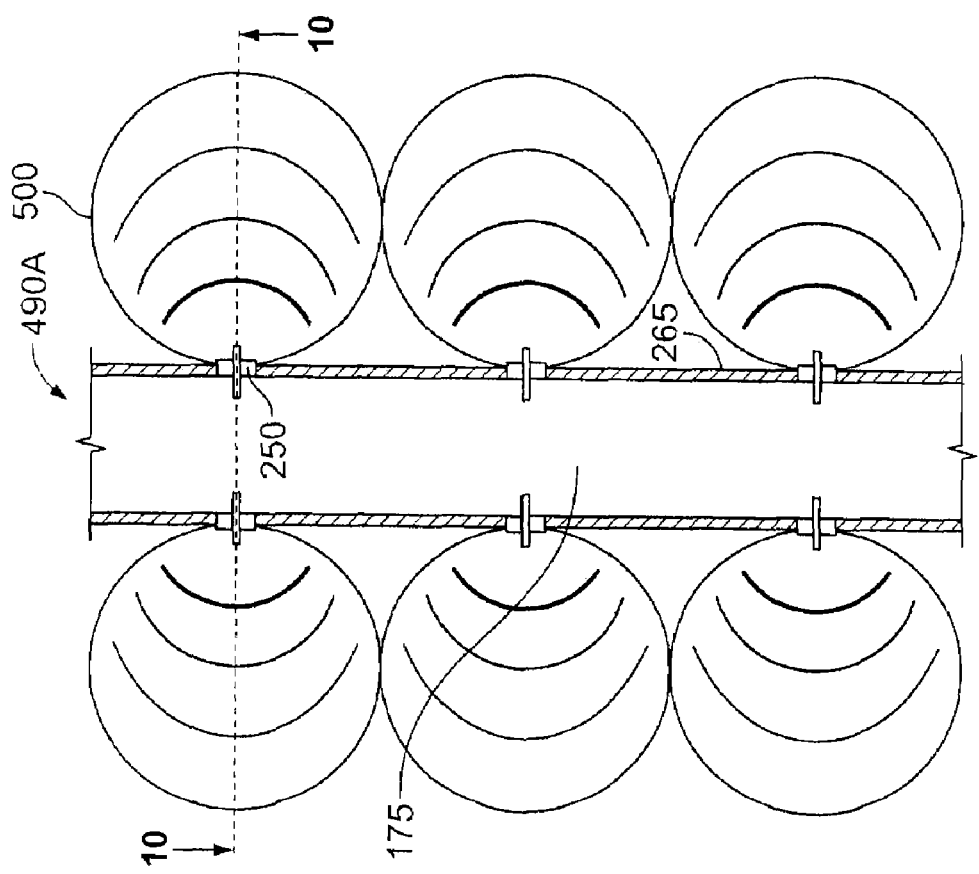
FIG. 10
FIG. 9

Impedance Side B  
Reactor Side

Impedance Side A  
Transmission Side

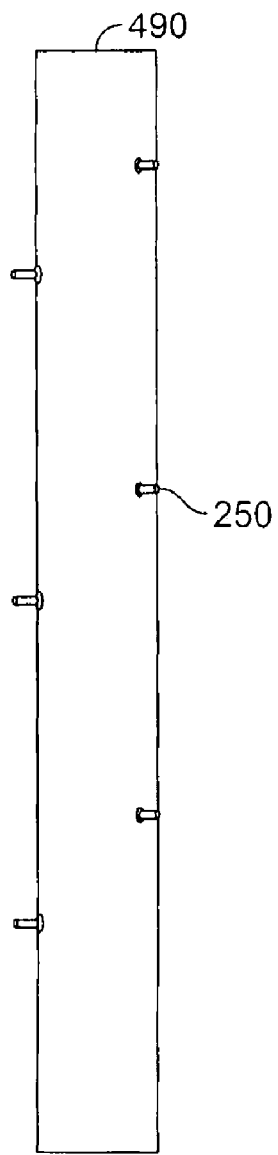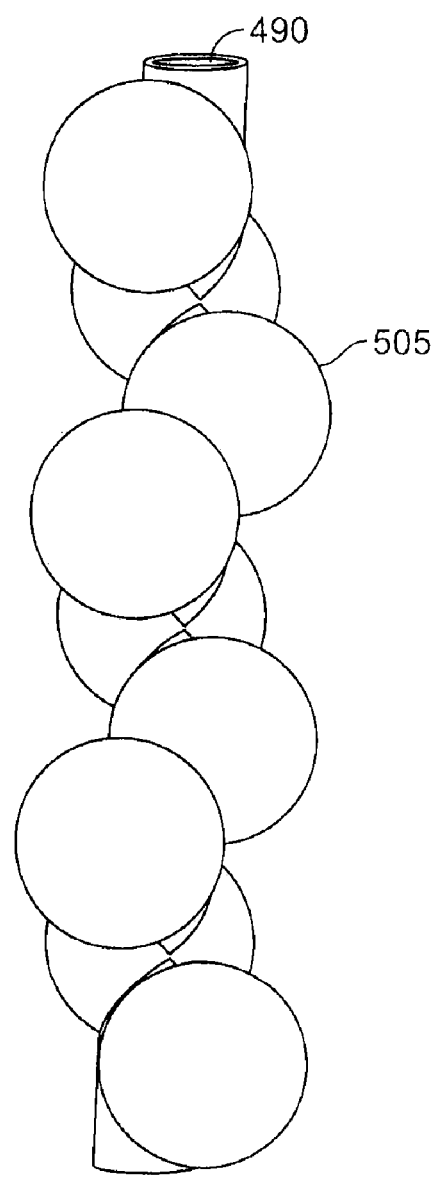
FIG. 27　　　　FIG. 28

PROCESSING APPARATUS WITH AN ELECTROMAGNETIC LAUNCH

BACKGROUND

The invention relates to processing apparatuses with one or more electromagnetic launches. More specifically, the invention relates to the launching of electromagnetic energy, such as microwave energy, into a reaction mixture, for example, which may include one or more reactants and may include a catalyst, in order to enhance a chemical process.

Electromagnetic and radio frequency (RF) energy, such as microwave energy, can be used in a variety of processes to enhance physical or chemical reactions. For example, RF energy (i.e., energy propagating at about 3 kHz to about 300 GHz) can be used with a catalyst to enhance the chemical reaction of a plurality of reactants. When using microwaves, the process is typically referred to as microwave-assisted or microwave-enhanced chemistry.

One of the challenges of utilizing RF energy, particularly microwave energy, in such processes is to efficiently couple the electromagnetic energy into the reaction mixture being processed. It is typically preferable that the electromagnetic energy be launched in such a way as to avoid or control hot spots in the reaction mixture and to adequately distribute the electromagnetic energy into the reaction mixture so that dead zones can be reduced or controlled.

SUMMARY

One way to promote the efficient transfer of energy is through the matching of the impedances of the source, load, and transmission means. For example, if a complex impedance of the microwave source is 50 ohms, and similarly a complex impedance of a transmission line and the load are 50 ohms, then in theory, the microwave energy will be nearly 100% transmitted from the source into the load. In the case that the impedance of the transmission line is matched to the impedance of the source, then there will be no reflected energy from the transmission line back to the source. Similarly, in the case that the impedance of the load is matched to the impedance of the source, then there will be no reflected energy from the load back to the source. In other words, when all impedances are matched, power is transmitted efficiently, without reflections, from the source to the load.

In at least one construction, the invention matches a complex impedance of a reactor load with a complex impedance of a microwave generator. In at least another construction, the invention provides an efficient distribution of microwave energy throughout the reactor volume (i.e., the load). In yet at least another construction, the invention provides a means for expanding the distribution of the microwave energy throughout any volume (e.g. modular and scalable).

In one embodiment, the invention provides a processing apparatus having a vessel including an inner surface defining a chamber configured to hold a reaction mixture, a guide at least partially disposed within the vessel, and a launch coupled to the guide and disposed at least partially within the vessel. The guide is configured to propagate electromagnetic energy, and the launch being configured to launch at least a portion of the electromagnetic energy from the guide into the reaction mixture.

In another embodiment, the invention provides a processing apparatus having a vessel including an inner surface defining a chamber configured to hold a reaction mixture, a guide configured to propagate electromagnetic energy, and a first launch and a second launch coupled to the guide and at least partially disposed within the vessel. Each of the first launch and the second launch are configured to couple a portion of the electromagnetic energy from the guide into the reaction mixture.

In another embodiment, the invention provides a processing apparatus having a vessel including an inner surface defining a chamber configured to hold a reaction mixture, a guide configured to propagate electromagnetic energy, and a first dielectric projection and a second dielectric projection coupled to the guide and at least partially disposed within the vessel. Each of the first dielectric projection and the second dielectric projection is configured to couple a portion of the electromagnetic energy from the guide into the reaction mixture.

Other aspects of the invention will become apparent by consideration of the detailed description and accompanying drawings.

BRIEF DESCRIPTION OF THE DRAWINGS

FIG. 9 is a partial section view (along line 9-9 of FIG. 10) of a waveguide capable of being used in the RF or microwave processing apparatus of FIG. 8.

FIG. 10 is a partial section view (along line 10-10 of FIG. 9) of a waveguide capable of being used in the RF or microwave reactor of FIG. 8.

FIG. 27 is a partial side view of a waveguide used in the reactor of FIG. 26.

FIG. 28 is a partial side view of the waveguide of FIG. 27 with portions of spheres representing a RF or microwave power penetration depth at the 1/e level.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof encompass both direct and indirect mountings, connections, supports, and couplings. Further, "connected" and "coupled" are not restricted to physical or mechanical connections or couplings.

Figure 1:
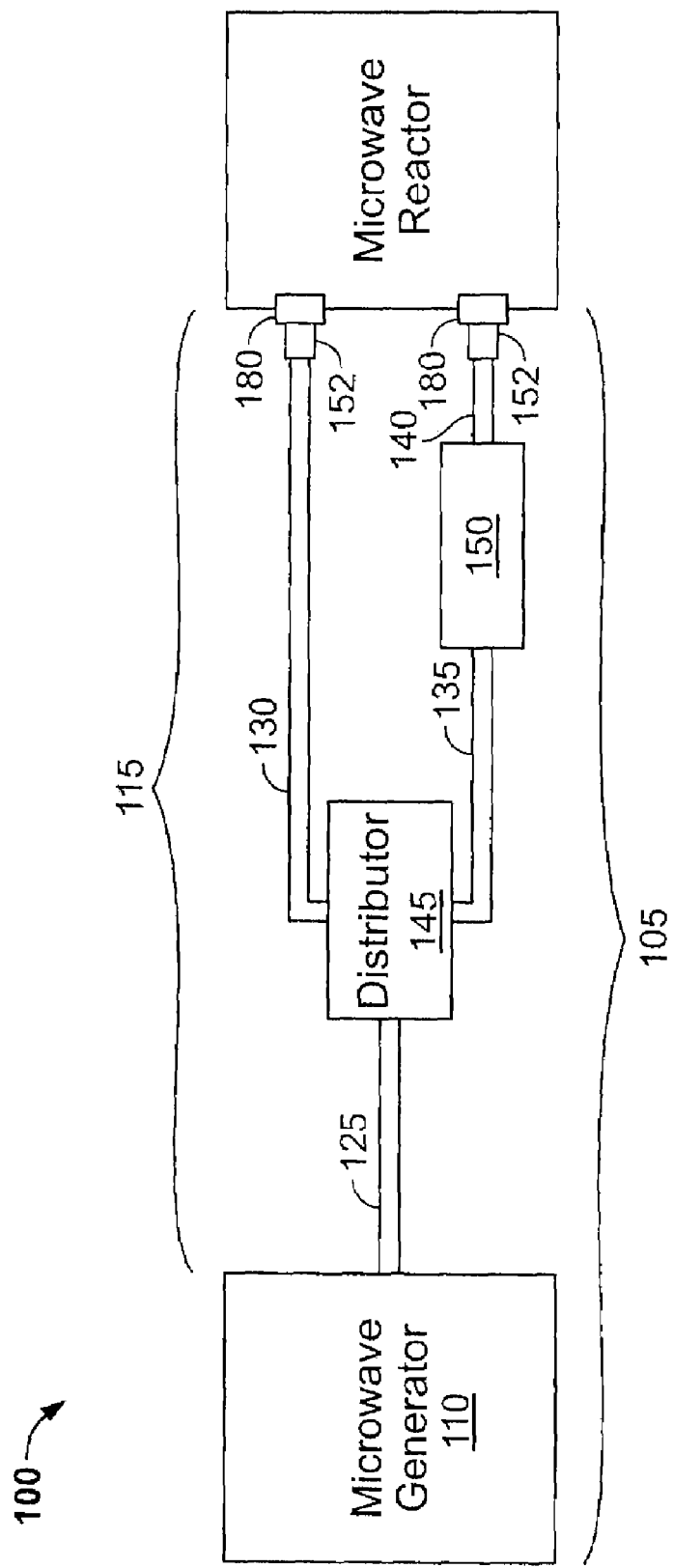
FIG. 1 is a schematic diagram of a RF or microwave-based processing apparatus incorporating the invention.

FIG. 1 represents a processing apparatus incorporating the invention. Generally speaking, the processing apparatus receives one or more reactants and produces one or more products using the one or more reactants. The process is facilitated by energy being provided to the reactants by the processing apparatus and may further be facilitated by one or more catalysts. The mixture being processed by the processing apparatus is referred to herein as a reaction mixture.

It should be understood that the reaction mixture may include any one of one or more reactants, one or more products, and one or more catalysts depending on the status of the processing apparatus. For example, prior to processing, the reaction mixture may include a reactant and a catalyst; during processing, the reaction mixture may include a reactant, a catalyst, and a product; and at the end of the process, the reaction mixture may include a catalyst and a product. Another example could include a process where the apparatus has a vessel containing a fixed bed of heterogeneous catalyst. In this case, reactants enter the catalyst bed where a reaction mixture is formed and RF or microwave energy is coupled into the reaction mixture, and products form and exit the vessel. It should also be understood that the reaction mixture may be a one-phase mixture, a two-phase mixture, or a three-phase mixture.

The processing apparatus shown in FIG. 1 is a RF or microwave-based processing apparatus 100, which provides RF or microwave energy to facilitate the processing of the reactants. While this description may focus on microwave-based apparatuses, the invention is not limited as such. Rather, other electromagnetic frequency energies may be used to facilitate the processing of the reactants.

FIG. 1 schematically illustrates a microwave source 105 that produces and transmits microwaves to a reactor (discussed further below). The microwave source 105 includes a microwave generator 110 and a guide-distribution system 115. An example microwave generator 110 capable of being used in the processing apparatus 100 is a 30 to 100 kW, 915 MHZ microwave generator available from Microdry Inc., having a web site address of http://www.microdry.com. The guide-distribution system 115 is coupled to the microwave generator 110 to receive microwave energy from the generator. While FIG. 1 shows only one microwave generator 110 and one guide-distribution system 1115, it is envisioned that the processing apparatus 100 may include multiple generators 110 and/or multiple guide-distributions systems 115.

The guide-distribution system 115 includes one or more interconnected guides (primary guide 125 and secondary guides 130, 135, and 140 are schematically represented in FIG. 1) for propagating the microwave energy from the microwave generator 100 to the reactor. The term "guide" is broadly defined herein as a material or device capable of propagating a form of electromagnetic energy from one location to another. For example, the guide can include a co-axial cable, a clad fiber, a dielectric-filled (e.g., filled with at least one of quartz, alumina, silica, boron nitride, Teflon, or other microwave transparent or translucent material, including gaseous filled or vacuum reduced dielectrics) waveguide, or a similar transmission line capable of propagating electromagnetic energy. Furthermore, the guide-distribution system 115 can include multiple guides of differing types. For example, the primary guide 125 can be a gaseous-filled waveguide and the secondary guides 130, 135, and 140 can be coaxial cables.

The guide-distribution system 115 can further include one or more distributors/dividers (distributor 145 is schematically represented in FIG. 1). The distributor 145 distributes the microwave radiation received from the primary guide 125 to secondary guides 130, 135, and 140. Of course, the number of guides connected to a distributor 145 can vary. Additionally, a distributor 145 is not required in all constructions of the guide-distribution system 115.

The guide-distribution system 115 can further include one or more transition devices (transition device 150 is schematically represented in FIG. 1). The transition device 150 allows the microwave to propagate from a first guide type (e.g., a dielectric-filled waveguide) to a second guide type (e.g., a coaxial cable) while reducing impedance matching losses. Similar to the distributor 145, the transition device 150 is not required in all constructions of the guide-distribution system 115. Other waveguide or coaxial components, known to those skilled in the arts, such as isolators, circulators, water loads, bends, couplers, waveguide or coaxial transitions and flanges, may also be included in the processing apparatus or into the distribution system.

The guide-distribution system 115 can further include one or more tuners (tuners 152 are schematically represented in FIG. 1). The tuners 152 improve impedance matching and allow for looser tolerances in differing elements, such as from nodes 130 and 140 to launches 180.

Various constructions of the microwave source 105 include: A) a single generator, a guide, and a single launch (which is discussed further below); B) a single generator, a guide-distribution system including a distributor, and a plurality of launches; and C) a plurality of generators, a guide-distribution system associated with each generator, and one or more launches associated with each generator. As will be discussed below, the launches can be "internal" or "external" to a reactor.

During operation, the guide-distribution system 115 propagates the electromagnetic energy (e.g., the microwave energy) from an electromagnetic wave generator (e.g., the microwave generator 110) to the reactor (discussed further below). The design of the guide-distribution system 115 can vary depending on, among other things, the design of the reactor and the means used to launch the electromagnetic energy into the reactor. It is typically preferable for the complex impedances of each node in the guide distribution system to match for efficient transmission of electromagnetic energy. For example, the impedances at node 125 into node 145, at node 145 into nodes 130 and 135, at node 135 into node 150, and at node 150 into node 140. It is also typically preferable for the impedance of the guide distribution system 115 to match the generator 110 (e.g., at node 110 into node 125) and for the impedance of each launch to match the coupled node (e.g., at nodes 130 and 140 into respective launches).

Figure 2:
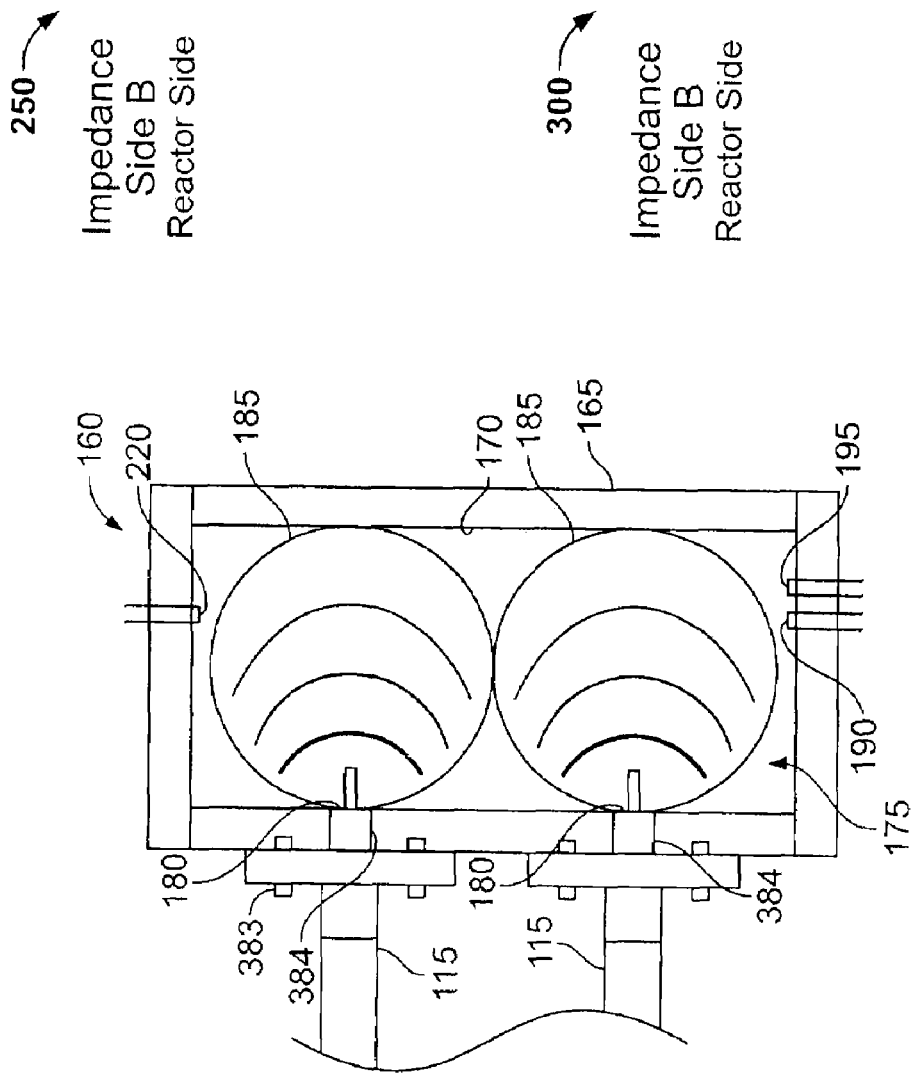
FIG. 2 is a schematic, sectional view (which is not to scale) of a RF or microwave reactor capable of being used in the processing apparatus of FIG. 1.

A schematic sectional view of a microwave reactor 160 capable of being used in the microwave-based processing apparatus 100 is shown in FIG. 2. In at least one construction, the reactor is a vessel providing a means of access for reactant(s) and exit for product(s) along with the required operating conditions, such as temperature, pressure, and residence time to achieve process objectives. Process objectives could be physical such as mixing or separation of reactant species or chemical such as the combining of two reactants molecules to create a new product molecule.

Referring to FIG. 2, the microwave-reactor 160 includes a vessel 165, such as a metal (e.g., steel) vessel. The vessel 165 has an inner surface 170 defining a chamber 175. The microwave reactor 160 includes one or more launches (e.g., launches 180 are schematically shown in FIGS. 1 and 2 and described in connection with FIG. 5) coupled to the guide-distribution system 115 (a portion of which is shown in FIG. 2) and supported by the vessel 165. The launches 180 launch energy (schematically represented in FIG. 3 as fields 185) from the guide-distribution system 115 into the chamber 175.

The launch 180 is an example of an electromagnetic launch capable of being used with the invention. As used herein, an "electromagnetic launch" is broadly defined as a device or apparatus capable of launching (e.g., propagating or radiating) electromagnetic energy from the guide into a reaction mixture. One may also refer to the electromagnetic launch as an "electromagnetic injector" because electromagnetic energy is being injected into the chamber as viewed from the chamber 175. The electromagnetic launch can include a window (e.g., a dielectric window) or a projection capable of launching electromagnetic energy from the guide into the chamber. The projection can include a metallic-based projection (e.g., a projection including a metallic pin, rod, spike, wire, sphere, etc.) or a dielectric-based projection (e.g., a projection including a dielectric pin, rod spike, fiber, sphere, etc.). The metallic-based projection and the dielectric-based projection will also be referred to herein as a "metallic antenna" and a "dielectric antenna," respectively, because the projections act like an antenna as viewed from the chamber 175.

Figure 3:
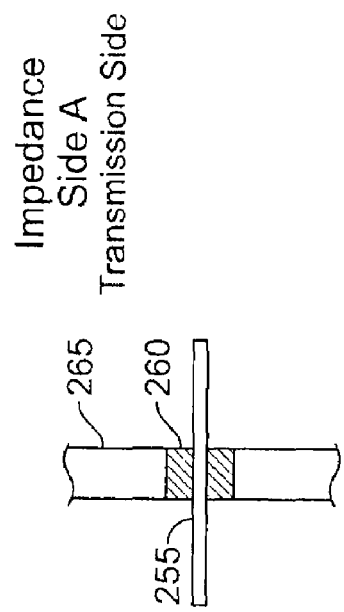
FIG. 3 is a schematic, sectional view of a launch capable of being used in the RF or microwave reactor of FIG. 1.

A schematic, sectional view of a simple launch 250 is shown in FIG. 3. The launch 250 includes a metallic projection rod 255, a dielectric insulator 260, and a conductor wall, which can be the vessel shell or a waveguide wall (waveguide wall 265 is shown for FIG. 3). The use of the projection rod 255 with the dielectric insulator 260, which is integrally coupled with waveguide wall 265, creates an antenna (e.g., a quarter-wave antenna). A portion of the electromagnetic energy propagating through the waveguide, on impedance side A, conducts through the projection rod 255. With the electromagnetic energy conducting through the projection rod 255, the projection rod 255 launches an electromagnetic field on impedance side B, which is inside the chamber 175.

Therefore, the projection rod 255 operates as an antenna and can couple an electromagnetic field into the reaction mixture. The reaction mixture has a complex impedance, which may or may not cause the reaction mixture to change in temperature. The temperature change is dependent upon whether the reaction exhibits an endothermic, exothermic, or a neutral net change of energy during the chemical reaction. The energy coupled is dependent upon the specific bulk loss tangent of the combined species in the mixture within the reactor. The energy coupled into any one species in the mixture is dependent upon its specific loss tangent. Generally a mixture or species with the higher loss tangent exhibits a greater absorption of electromagnetic energy with a faster decay of electromagnetic field intensity into that mixture or species relative to another mixture or species. In some embodiments, the reaction mixture is a substantially lossless dielectric reaction mixture with a loss tangent less than 0.1.

Figure 4:
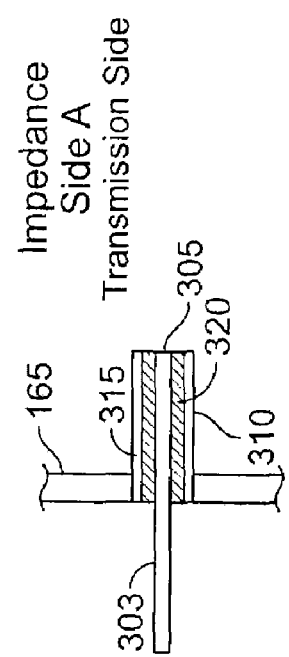
FIG. 4 is a schematic, sectional view of a launch capable of being used in the RF or microwave reactor of FIG. 1.

A schematic, sectional view of a launch 300 is shown in FIG. 4. The launch 300 includes a metallic projection rod 303, which is part of the center conductor 305 of a coaxial cable connector 310. The coaxial cable connector 310 includes an outer conductor 315 (e.g., a braided conductor), a dielectric insulator 320, and the center conductor 305. The coaxial cable connector 310 is supported by a wall such as the vessel shell 165. The center conductor 305 extends beyond the dielectric insulator 320 and the conductor 315, such that the projection rod 303 acts like the projection rod 255 discussed above. The coaxial cable connector 310 propagates electromagnetic energy through the connector 310, resulting in the projection rod 303 radiating or coupling electromagnetic energy to impedance side B.

Therefore, the projection rod 303 operates as an antenna and can couple or radiate an electromagnetic field into the reaction mixture. As was discussed for FIG. 4, the reaction mixture has a complex impedance, which determines the degree of energy coupled into the reaction mixture. The coupling of energy into the reaction mixture promotes the process.

It is envisioned that in other constructions of the projection, the metallic antenna can take other forms, including but not limited to, a pin, a spike, a coiled wire, and/or a sphere. It is also envisioned that the projection can consist of or include other materials, including a dielectric material.

Figure 5:
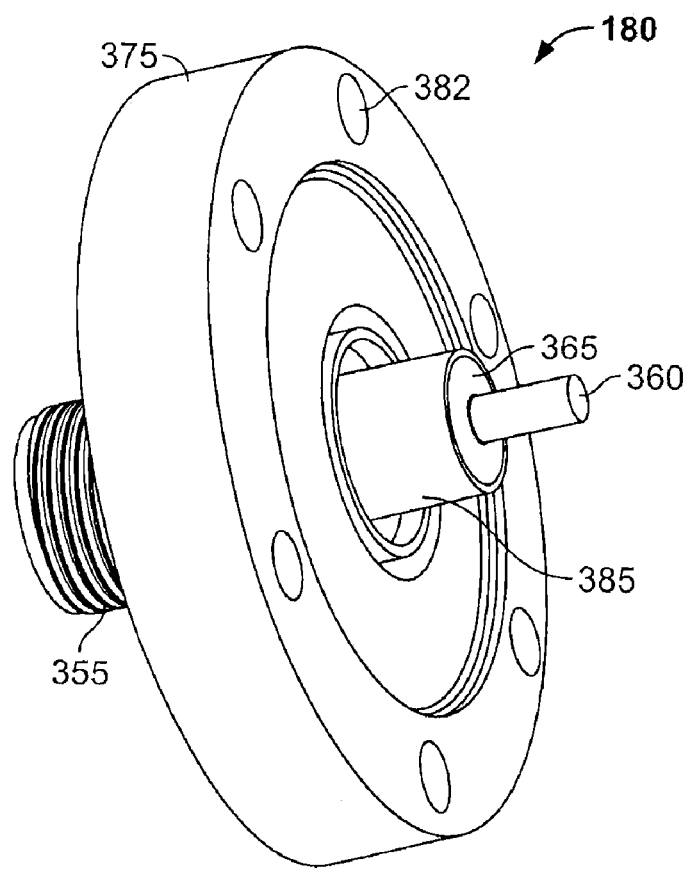
FIG. 5 is a perspective view of a launch capable of being used in FIG. 2.

FIG. 5 shows a perspective view of the launch 180 capable of being used with the microwave reactor 160 (FIG. 2). The launch 180 includes a terminal that couples to a coaxial cable. More specifically, the launch 180 includes threads 355 that interconnect with corresponding threads of a coaxial cable. Similar to the launch 300, the launch 180 includes a dielectric 365 and a projection rod 360. The launch 180 also includes a flange 375 having apertures 382 used for securing the launch 180 to the vessel 165 (FIG. 2) with fasteners 383 (e.g., bolts, rivets, etc.). The vessel 165 includes apertures 384 that receive the projection 385, including rod 360. A launch 180 capable of being used with the microwave reactor is available from CeramTec North America having a web site address of http://www.ceramaseal.com.

Figure 6:
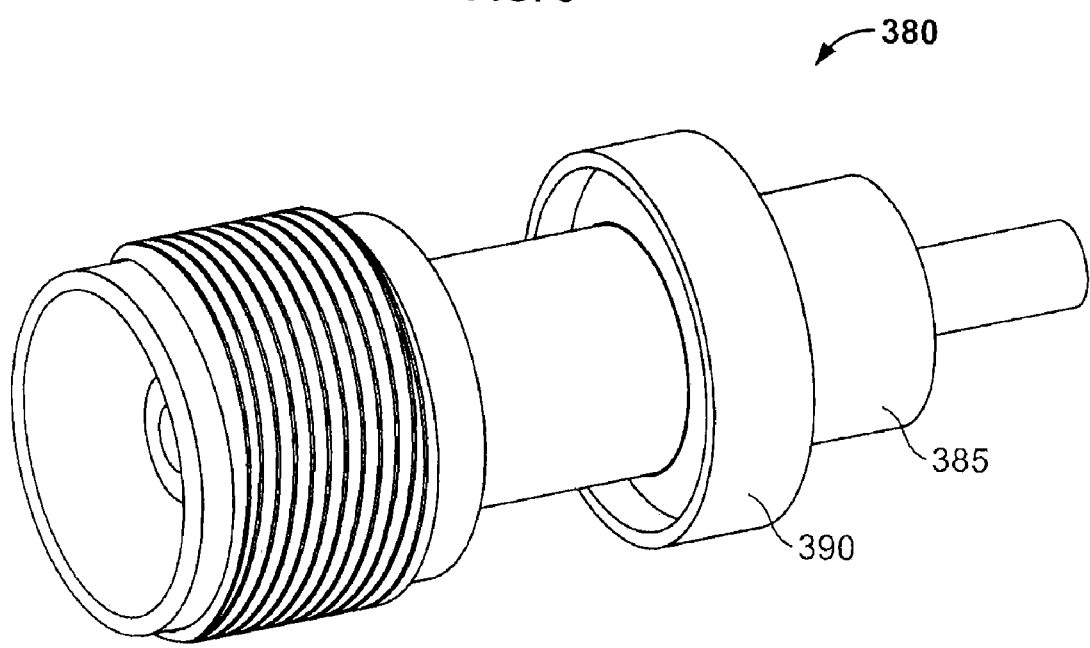
FIG. 6 is a perspective view of a launch capable of being used in the RF or microwave reactor of FIG. 1.

FIG. 6 shows a perspective view of a launch 380 capable of being used with the microwave reactor 160. The launch 380 is similar to the launch 180, except the launch 380 does not include the flange 375 for receiving a bolt, rivet, or similar fastener. Instead, the launch 380 is secured to the vessel 165 by inserting projection 385 into an aperture of the vessel 165, and welding flange 390 to the vessel wall. That is, the fastener for coupling the launch 380 to the vessel is a weld. However, other fasteners, such as glues and chemical bonds, can be used in place of a weld. Also, other fasteners, such as compression fasteners, can be used for fastening the electromagnetic launches to the vessel 165. Additionally, the sealing means can also incorporate means to prevent the leakage of the electromagnetic energy, such as incorporating an electromagnetic absorber into the O-ring or gasket.

While FIGS. 5 and 6 include threads for interconnecting a coaxial cable to the launches 180 and 380, other flanges known to those skilled in the art and fasteners (e.g., welds, glues, chemical bonds, compression fasteners, etc.) can be used. Also, it is envisioned that other types of guides (e.g., dielectric-filled waveguides) can couple to the launches 180 and 380 for propagating the electromagnetic energy to the launches 180 and 380.

The commercial market for glass to metal seal feed-throughs is primarily for analytical equipment where tests are performed separately under high vacuum, high pressure, and high temperature. The manufacturers of these products report the operating temperature and pressure ranges, but it is commonly known that they do not test the feed-throughs at both their upper operating high temperature limit and at their upper operating pressure limit at the same time. For example, the launch shown in FIG. 6 typically has specifications listed as follows:

Pressure at 20° C.: 320 psig
Temperature Minimum: −269° C.
Temperature Maximum: 450° C.

The manufacturer has not tested the unit to determine the maximum pressure at its maximum operating temperature. The lack of having microwave products able to operate at both elevated temperature and pressures has limited microwave energy in its use on commercial scale chemical processes.

It should be noted, that windows, made of microwave transparent materials, like quartz or sapphire, have been used to launch microwaves into test chambers. These windows can withstand elevated temperatures greater that 450° C. if the proper sealing materials are used. The problem with the commercial implementation of these windows is the cost to make these windows able to operate at elevated temperatures and pressures. As the window diameter increases, the window thickness increases proportionally, and the increased window dimensions dramatically increases the cost of the window. Thus, a window designed for a 915 MHz source would have a larger diameter, and would be significantly more expensive than for a window designed for a 2.45 GHz source. The coax feed through design is smaller in diameter and will be more cost effective to implement if it can be shown to operate at elevated pressure and temperature conditions.

Tests were performed with the launch shown in FIG. 6 welded into a stainless steel chamber. The chamber was instrumented with temperature and pressure sensors and capable of being heated up to 500° C. and at pressures up to 300 psig. Over the course of a month, the launch was subjected to temperatures ranging from 200-475° C. and pressures up to 300 psig. Once the test chamber temperature was established, the test chamber would be pressurized and allowed to stand for at least overnight to determine if any leaks developed in the launch. The chamber pressure would then be cycled from ambient to test pressure and allowed to stand at the test pressure to again measure for leaks. Rapid and slow pressure cycling tests were performed. Pressure temperature combinations included:

150° C. 200 psig
250° C. 200 psig
350° C. 200 psig
400° C. 260 psig
425° C. 260 psig
450° C. 260 psig
450° C. 300 psig
475° C. 300 psig Leaks were not observed until the chamber reached 475° C. at 300 psig. Upon lowering the temperature below 450° C. leaks were no longer observed.

Figure 7:
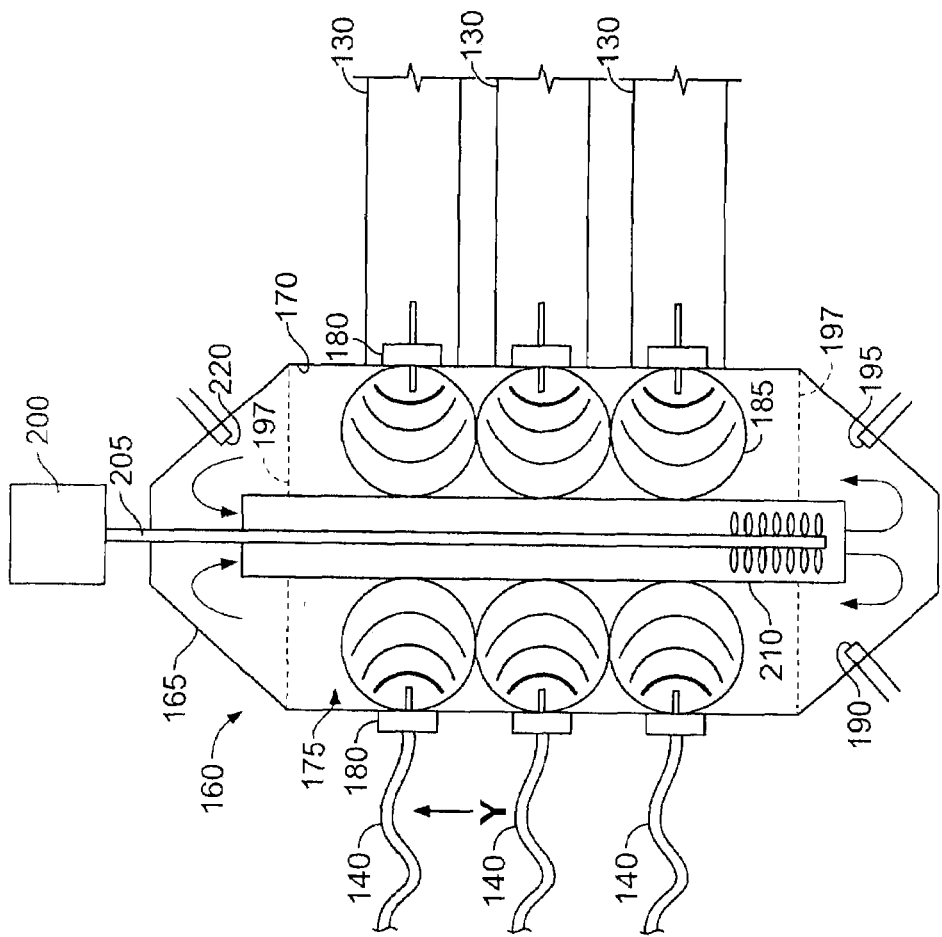
FIG. 7 is a schematic, sectional view (which is not to scale) of a RF or microwave reactor capable of being used in the microwave processing apparatus of FIG. 1.

Referring now to FIG. 7, the figure is a schematic, sectional view of a stirred-bed microwave reactor 160 capable of being used in the microwave-based processing apparatus 100. FIG. 7 also shows a portion of a guide-distribution system. The microwave-reactor 160 includes the vessel 165 having the inner surface 170 defining the chamber 175. The chamber 175 receives one or more reactants through one or more inlets (or ports) of one or more feed tubes. For example, FIG. 7 shows a first inlet 190 to allow a first reactant (e.g., a hydrocarbon) to enter the vessel 165, and a second inlet 195 to allow a second reactant (e.g., $H_2$ gas) to enter the vessel 165. Of course, the reactants can enter through a single inlet or by other means.

The vessel 165 can also receive a catalyst. The catalyst can also enter the vessel by an inlet or can be placed in the vessel by some other means. For example, the vessel 165 can open to allow a heterogeneous catalyst to be placed in the vessel 165. The heterogeneous catalyst can be held between support screens 197. The type of catalyst used can vary depending on the reactor 160 and/or the desired process. For example, the catalyst can be a heterogeneous catalyst or a homogeneous catalyst.

For the reactor shown in FIG. 7, a motor 200 rotates a stirrer 205 housed in a draft tube 210 causing the reaction mixture, excluding the catalyst, to flow down through the draft tube 210. The reaction mixture moves through energy fields, schematically represented by fields 185, resulting in a processed product. The processed product is released from the chamber 175 by an outlet (or port) 220.

Therefore, the draft tube 210 can serve the purpose of creating turbulence with the reaction mixture and/or the feeds to result in mixing. The draft tube 210 can also be used to reflect microwave energy from the launch to provide a desired result (e.g., promoting a uniform microwave field). Further, the draft tube 210 can minimize interactions from other launches, thereby minimizing mutual coupling. It is also envisioned that the reactor can include other tubes or structure for reflecting microwave energy and for minimizing mutual couplings.

In other constructions, other means can be used to move the reaction mixture through the chamber 175. For example, the reactor 160 can include one or more inlets and one or more outlets, with the heating resulting from the energy fields, to cause the reaction mixture to move without the draft tube 210 and stirrer 205. The removal and introduction of products and reactants, respectively, with the microwave energy coupled into the reaction mixture causes, in some reactions, sufficient movement of the reaction mixture in the chamber 175.

Industrial applications for the reactor 160 shown in FIG. 7 would be the hydroprocessing of a fossil fuel or the processing of a biofuel. For example, U.S. Patent Publication Nos. 2004/0074759 and 2004/0074760, the contents of which are incorporated herein by reference, disclose two methods of performing microwave-assisted chemistry. In the instance of hydroprocessing a fossil fuel, the fossil fuel and hydrogen would be preheated and mixed to a temperature below the point of undesirable reactions taking place, such as coking. The fossil fuel-hydrogen mixture would be fed into the microwave reactor's catalyst bed whereby the combination of process conditions (e.g. temperature, pressure, liquid hourly space velocity (LHSV), microwave power, and modulation) and catalyst activity would promote the desired hydroprocess (e.g. hydrogenation, hydrocracking, hydrodesulfurization, hydrodenitrogenation, hydrodemetalization, etc.).

Referring again to FIG. 7, the microwave reactor 160 includes one or more launches (e.g., launch 180 is schematically shown in FIG. 7) coupled to the guide-distribution system (a portion of which is shown in FIG. 7) and supported by the vessel 165. The launches 180 launch microwave energy (schematically represented in FIG. 7 as fields 185) from the guide-distribution system 115 to the chamber 175. The microwave energy is coupled into the reaction mixture based upon the reaction mixtures complex impedance. The coupling of energy into the reaction mixture promotes the desired chemistry of the process. For example, an application where localized temperature rise is important to the process, the microwave energy is coupled so as to cause a rapid temperature rise that can speed the reaction occurring in the vessel 165. Microwave energy transfer utilizes the dielectric energy transfer mechanism of the reaction mixture to create a temperature profile that contrasts, potentially significantly, to conventional heat conduction mechanisms. One possible result of the microwave heating is to significantly improve the selectivity and speed of chemical reactions. Another possible result is a shorter reaction time that minimizes undesirable side reactions that would minimize product decomposition and maximize product yield. Therefore, the type and/or location, as well as other characteristics (e.g., number), of the launches can affect the reaction time and quality of the microwave-assisted chemistry.

For FIG. 7, the guide-distribution system includes a plurality of waveguides 130 and a plurality of coaxial cables 140. The plurality of launches 180 are coupled to the waveguides 130 and coaxial cables 140. For simplicity, only a portion of the guide-distribution system is shown in FIG. 7; however, other portions of the guide-distributions system 115 of FIG. 1 may or may not be present. Further, while FIG. 7 shows waveguides 130 and cables 140, both types of transmission lines are not required.

Figure 25:
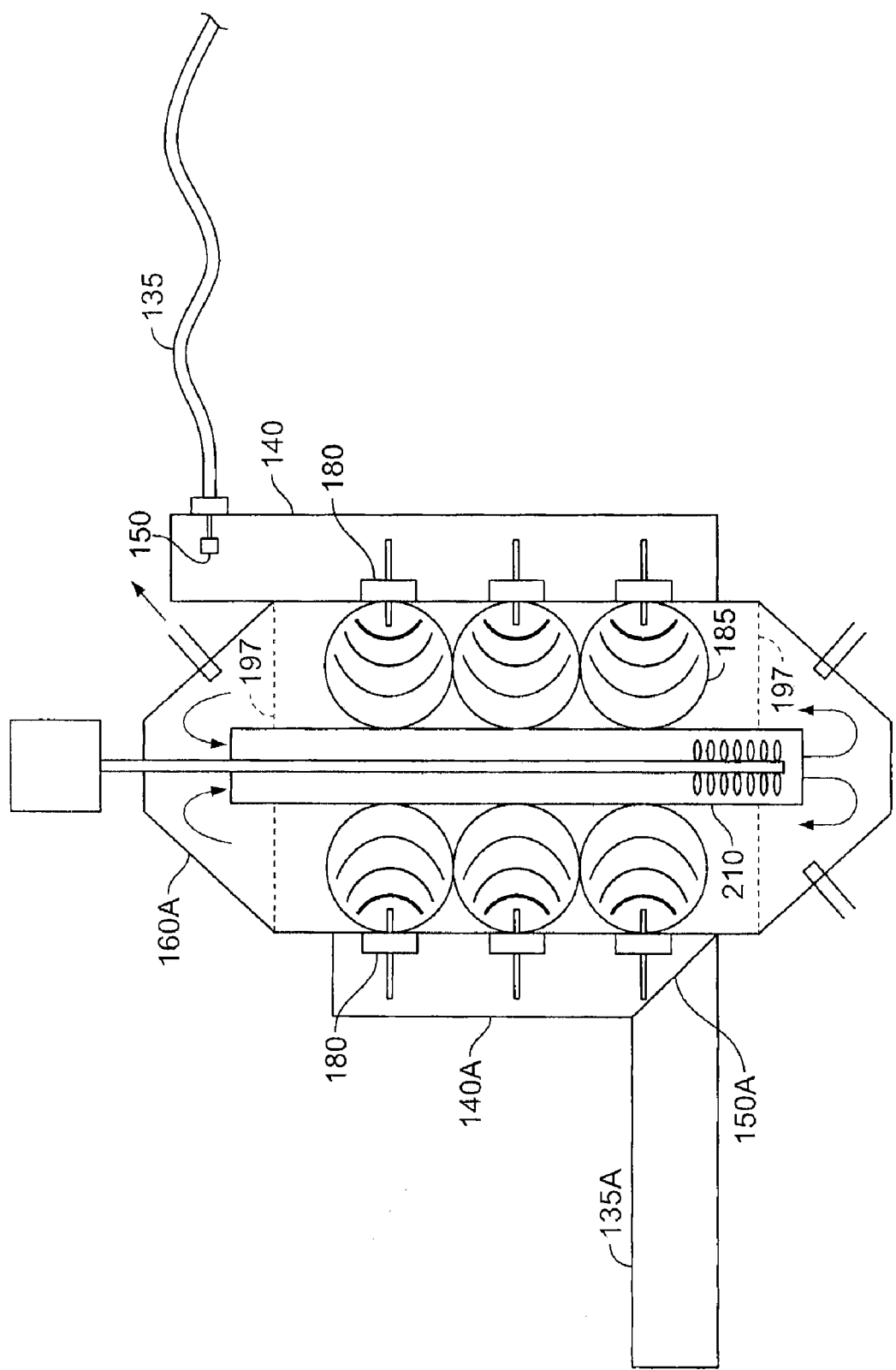
FIG. 25 is a schematic, sectional view (which is not to scale) of another RF or microwave reactor capable of being used in the RF or microwave processing apparatus of FIG. 1.

FIG. 25 shows another construction of a stirred-bed microwave reactor 160A capable of being used in the microwave-based processing apparatus 100. For FIG. 25, the guide distribution system includes a first transition 150 from a coaxial cable 135 to a waveguide 140, and a second transition 150A from a first waveguide 135A to a second waveguide 140A. The launches 180 are then coupled to the waveguides 140 and 140A. Similar to FIG. 7, other portions of the guide-distributions system 115 of FIG. 1 may or may not be present, and other arrangements for the guide-distribution system 115 are envisioned.

It should be apparent from FIG. 7 that the microwave reactor 160 can be scalable. For example, the microwave reactor 160 shown in FIG. 7 can have eighteen (six are shown) launches 180 divided into three levels of six launches 180. In another construction, the vessel 165 can be lengthened along the Y-axis such that a fourth level of six launches can be added to the microwave reactor 160. Therefore, the microwave reactor 160 is scalable along the Y-axis. Other microwave reactors 160 can be scalable depending on the design of the vessel 165, the means for introducing the microwave energy to the reaction mixture, and the expected impedance of the reaction mixture.

Figure 8:
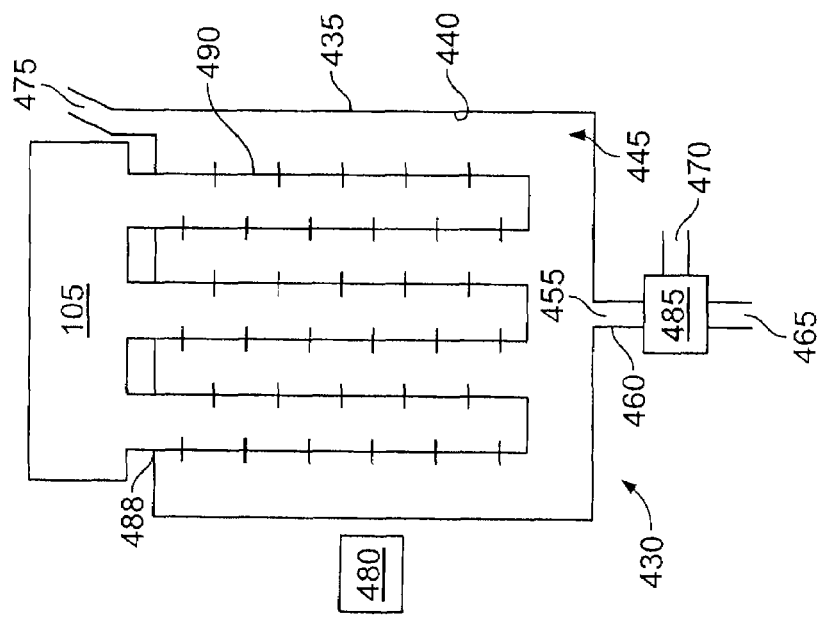
FIG. 8 is a schematic, sectional view (which is not to scale) of a second RF or microwave reactor capable of being used in the microwave processing apparatus of FIG. 1.

FIG. 8 is a schematic, sectional view of another microwave reactor 430 capable of being used with the processing apparatus 100. The reactor 430 includes a vessel 435 having an inner surface 440 defining a chamber 445. An inlet 455 introduces the reaction mixture to the chamber 445 from a feed tube 460. The reactor may utilize homogeneous catalysts, heterogeneous catalysts or a combination of the two. The feed tube 460 includes two ports: a first port 465 to receive one or more reactants and a second port 470 to optionally receive one or more catalysts. The reactor 430 launches electromagnetic energy (i.e., microwave energy for the processing apparatus 100) into the reaction mixture to promote a physical or chemical reaction, resulting in one or more products. The one or more products are released from the chamber 445 by an outlet 475. As discussed above, the means for introducing the reactants and/or catalysts, moving the reactant mixture, and releasing the products may vary. It is also contemplated that the one or more reactants and the one or more catalysts can be heated prior to introducing them into the chamber 445 and/or the microwave reactor 430 can include a heater (schematically represented as 480) for heating the reaction mixture in the chamber 445, such as a steam or oil jacket. Further, it is envisioned that the microwave reactor 430 can include a preheater (schematically represented as 485) for preheating the temperature of the reaction mixture in the chamber 445.

The vessel 435 includes a port 488 (a plurality of ports is shown in FIG. 8) that couples a dielectric-filled waveguide 490 to the microwave source 105 (FIG. 1). More specifically, the waveguide 490 can be coupled to another waveguide 130 (FIG. 1) or a distributor 145 (FIG. 1). The waveguide 490 receives microwave energy from the microwave source 105 via the port 488 and propagates the microwave energy through the waveguide. For the construction shown in FIG. 8, the waveguide 490 terminates in the chamber 445. However, the waveguide 490 can extend through the vessel 435.

FIG. 9 is a partial sectional view of a waveguide 490A along line 9-9 of FIG. 10, and FIG. 10 is a sectional view of the waveguide 490A along line 10-10 of FIG. 9. The waveguide 490A can be used in the reactor 430 of FIG. 8. The waveguide 490A includes launches (launch 250 is shown in FIGS. 9 and 10) for launching microwave energy from the waveguide 490A into the chamber 445. The launches 250 shown in FIGS. 9 and 10 are similar to the launches 250 shown in FIG. 3. That is, the launches 250 used in the waveguide 490A of FIG. 9 include a projection rod 255 (FIG. 3) supported by a dielectric insulator 260 (FIG. 3), which is integral with the waveguide wall 265. As was discussed with FIG. 3, the launches 250 act as antennas and couples or radiates electromagnetic energy into the chamber 275. The microwave energy coupled into the chamber has a microwave penetration depth (typically referred as 1/e) for active E&M fields. The penetration depth, is the distance by which the power density has decreased to about 37% of its initial value, and is represented in FIGS. 9 and 10 by spheres (sphere 500 is shown in FIGS. 9 and 10), although the decay shape is technically exponential.

Figure 12:
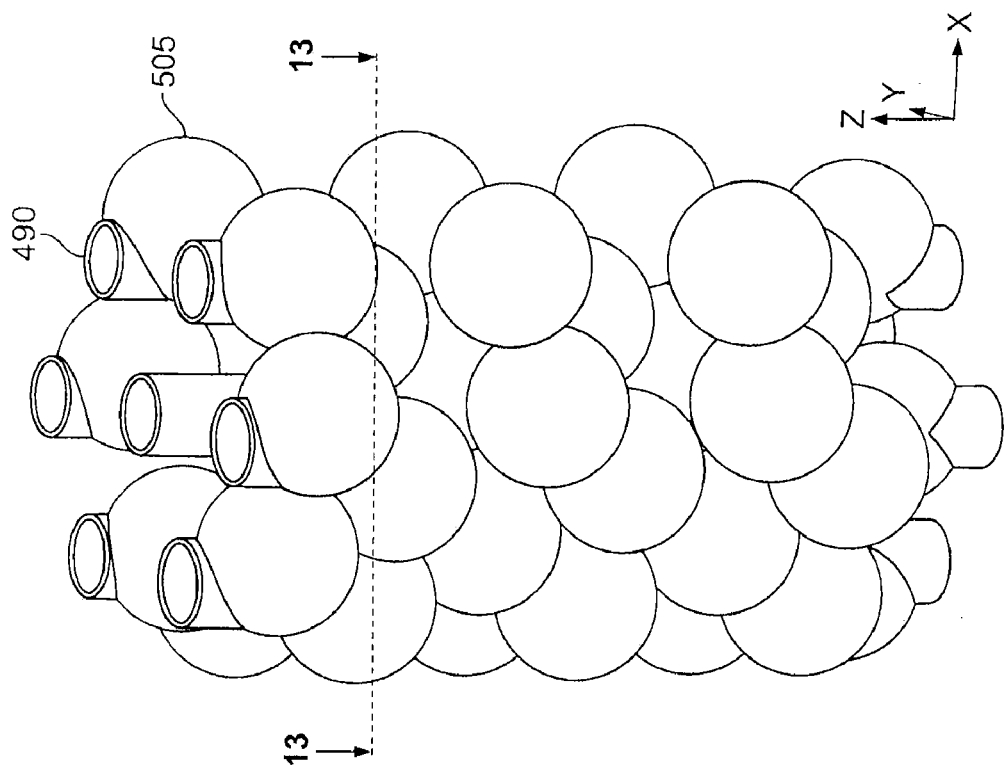
FIG. 12 is partial perspective view of the dielectric-filled waveguides of FIG. 8.
Figure 11:
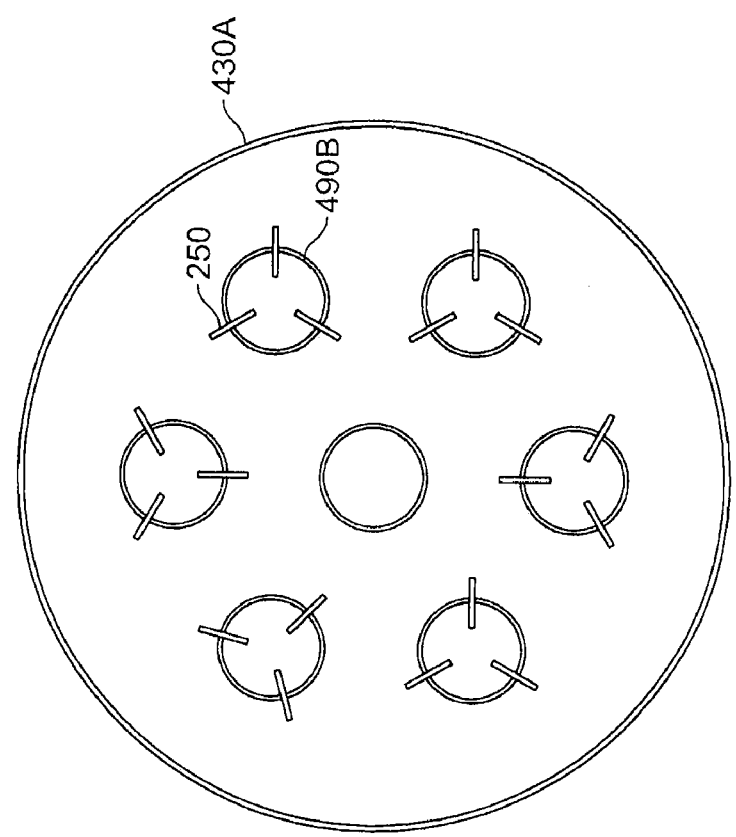
FIG. 11 is a partial sectional view of a microwave reactor capable of being used in the RF or microwave processing apparatus of FIG. 1.
Figure 13:
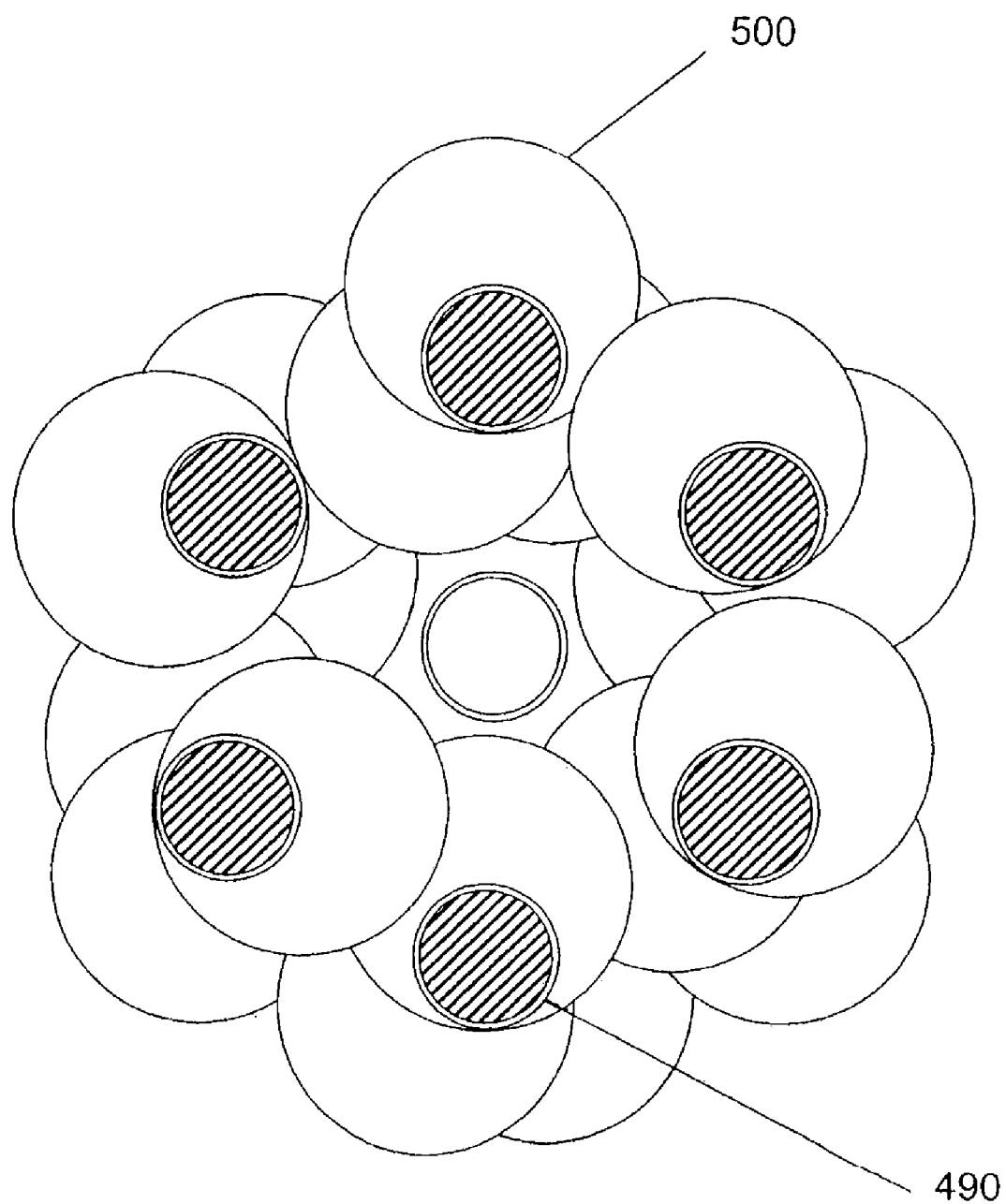
FIG. 13 is a sectional view of the second RF or microwave reactor taken along line 13-13 of FIG. 12.
Figure 26:
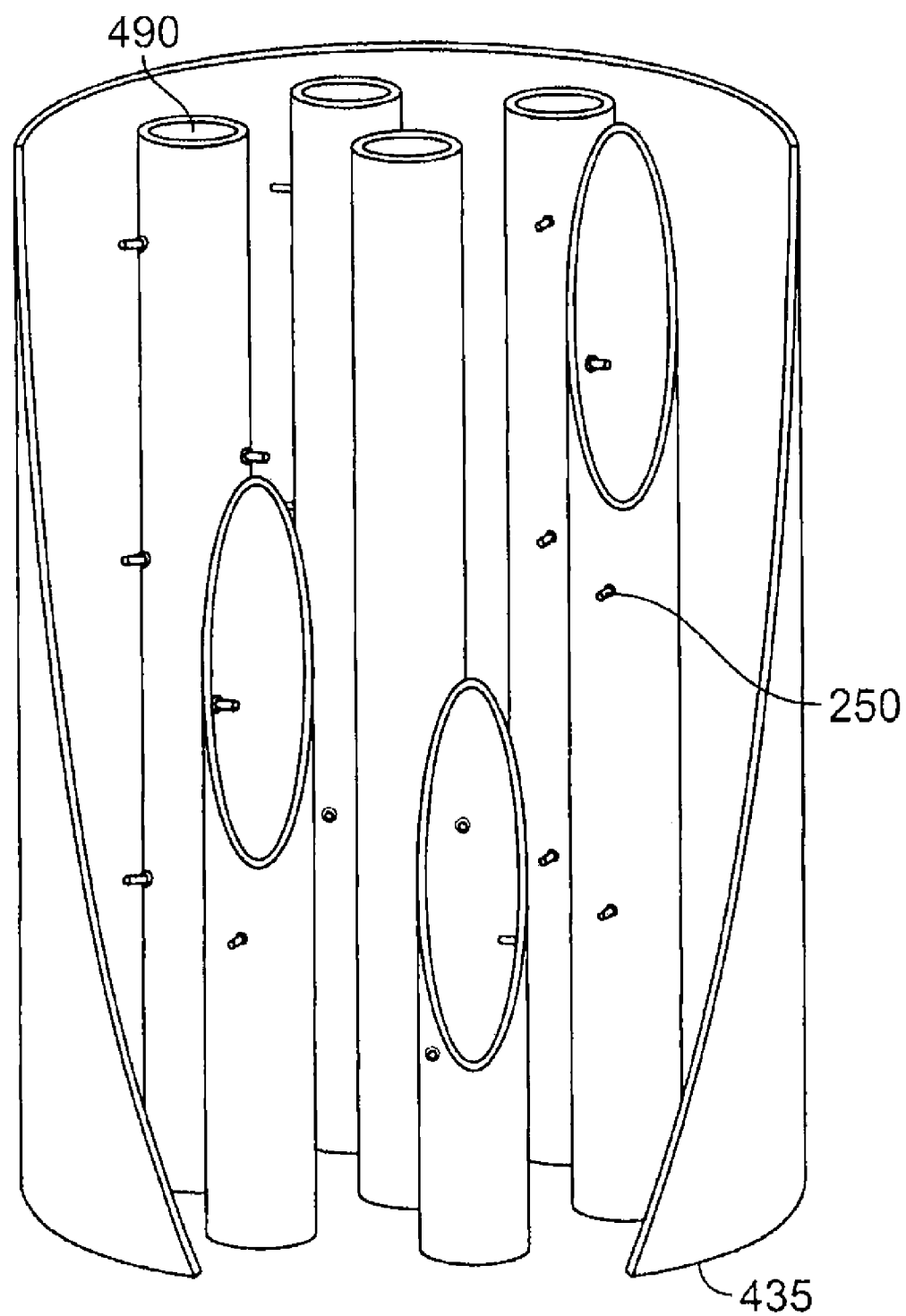
FIG. 26 is a partial cutaway view of the wave the waveguides of FIG. 12 disposed in a chamber of a RF or microwave reactor.

FIG. 11 is a partial sectional view of the reactor 430A having six waveguides 490B, each of which includes three launches 250 in the sectional view. Accordingly, the sectional view of FIG. 11 shows eighteen launches 250. FIG. 12 is a partial perspective view of six waveguides 490 (of FIG. 8) with portions of spheres 505 representing the microwave penetration depths for the launches 250. Unlike FIG. 9, the eighteen launches 250 shown in FIG. 11 are offset to create a helical or spiral effect for the portions of spheres 505, for example as shown in FIG. 28. FIG. 13 is a top view of FIG. 12 along line 13-13. As shown in FIGS. 12 and 13, the placement of the waveguides 490 and the launches 250 promote a controlled electromagnetic field pattern in the chamber 445. FIG. 26 is a partial cutaway view of the seven waveguides of FIG. 12 disposed in the vessel 435. FIG. 27 is a partial side view of a waveguide 490 used in the reactor 430 of FIG. 26. The waveguide 490 of FIG. 27 includes multiple launches placed in a spiral pattern across and around the surface of the waveguide. FIG. 28 is a partial side view of the waveguide 490 of FIG. 27 with portions of spheres 505.

As will be discussed in more detail below, it is envisioned that one can vary the number and locations of the waveguides 490, the number and locations of the launches 250, the properties (e.g., shape, type, dielectric filling, etc.) of the waveguide 490, the properties of the launches 250 (e.g., shape, type, composition, etc.), and/or the intensity of the electromagnetic field to result in a desired electromagnetic field pattern in the chamber. For example, the desired electromagnetic field pattern can be a substantially uniform distribution pattern. It also should be apparent from FIGS. 11-13 that the microwave reactor can be scalable. For example, the microwave reactor vessel shown in FIG. 12 has six waveguides with a set length. In another construction, the number of waveguides and the length of the waveguides, for example, can vary to allow for a larger or smaller processing vessel.

For FIGS. 8, 12, 13, and 26-28, the microwave guide 490 assists the conveyance of microwave energy to the launch 250 and is at least partially located inside the reactor 430. The guide 490 is generally a loss-less means of conveying microwave energy to the launch 250. With this internal distribution, the portion of the guide 490 that is within the reactor 430 also functions as a distributor of the microwave energy to one or more launches 250. Generally this use of the distributor's function is to distribute or to divide the microwave energy between and into the one or more launches 250. Generally the distribution is of even or equal proportions, however for specific requirements, the fraction of distribution can be readily controlled. This type of distributor can be comprised of nearly any means known to those skilled in the art to convey or to transfer microwave energy, but attention typically should be given to the generally elevated temperatures of the materials within the reactor 430 and to seals and material compatibility properties so that the components will not degrade.

A particularly suitable type of guide to use for distribution of microwave energy within the reactor is a circular or rectangular metallic waveguide (a circular waveguide 490 is shown in FIGS. 8-13 and 26-28). The metallic waveguide may either be hollow or filled with a dielectric such as air, nitrogen, or other gasses or other materials that are transparent or semitransparent to microwaves such as ceramics, Teflon, and plastics. The use of a microwave or RF transparent or semi-transparent filler within the guide distribution system has the added advantage that the diameter (or other measures comprising the internal dimensions) of the waveguide 490 may be constructed using a differing dimension, generally smaller, (compared to air or vacuum filled) for a given frequency of microwave or RF energy and which is dependent upon the filler material's dielectric constant. Additionally, if the dielectric constant of the material within the distribution guide is suitably selected with respect to the dielectric constant of the average bulk dielectric constant's constituents within the reactor, then the spacing of multiple launches (onto the outer surface of the distributing guide) can be made fairly easily at nearly any desirable location by one skilled in the art. The dielectric constant of the material inside the distributing waveguide would be chosen by one skilled in the art to control or to nearly match the wavelength of the propagating electromagnetic fields inside the (generally loss-less) distributing guide to control or to match the wavelength of the decaying electromagnetic fields within the (lossy) reactor volume.

An example of a single distributing waveguide with multiple launches can be seen in FIG. 27. The launches 250 can be placed in a spiral pattern across and around the surface of the distributing waveguide, or can be placed in many different patterns which may be symmetrical or random in location upon the surface of the distributing waveguide. The locations of the launches are generally selected to suitably fill the volume of the reactor with a pattern of electromagnetic fields into which the distributing waveguide is placed. A three-dimensional hexagonal-packing pattern is a very efficient packing density when using a spherical 1/e field model representation for the electromagnetic field decay emanating from each launch. FIG. 28 shows a partial side view of the single waveguide of FIG. 27 with potential 1/e electromagnetic field spherical distributions around the distributing waveguide and emanating from the location of each launch. Multiple distributing waveguides 490 can be placed into a cylindrical reactor 430 to achieve nearly any desired reactor volume. This is depicted schematically in FIGS. 8 and 26 which illustrates the multiple launches 250 and in FIG. 12 where the electromagnetic field distributions 505 are emanating from the location of each launch from the surface of the distributing waveguide.

For the simplest operation the RF or microwave source(s) can be operated in a continuous wave (CW) mode. Additionally, modulation of one or more microwave generators 110 can be used. For example, proper modulation techniques known to those skilled in the art allow the electromagnetic power fields to be swept through the reactor 430, similar to phased-array or aperture controlled radar. Controlling the phase and power of an array of smaller antennas into the applicator and suitably sweeping the amplitude and/or phase can create a constructive, additive, wavefront that sweeps through the space volume. Time averaging or other modulation techniques can also be used to achieve a more uniform microwave coupling of RF energy over time throughout the applicator volume and throughout the catalyst bed.

Figure 14:
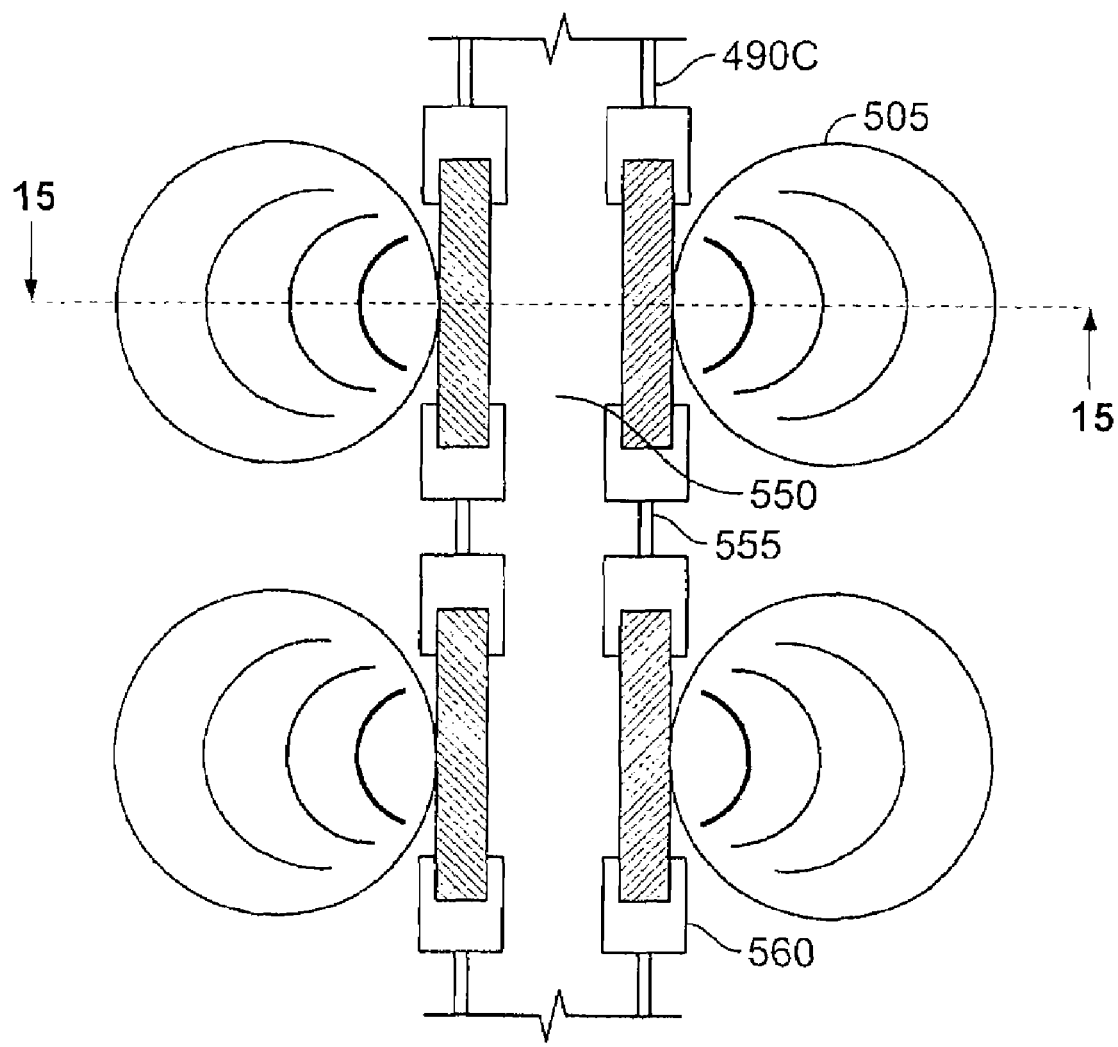
FIG. 14 is a partial section view (along line 15-15 of FIG. 14) of a waveguide capable of being used in the RF or microwave processing apparatus of FIG. 8.
Figure 15:
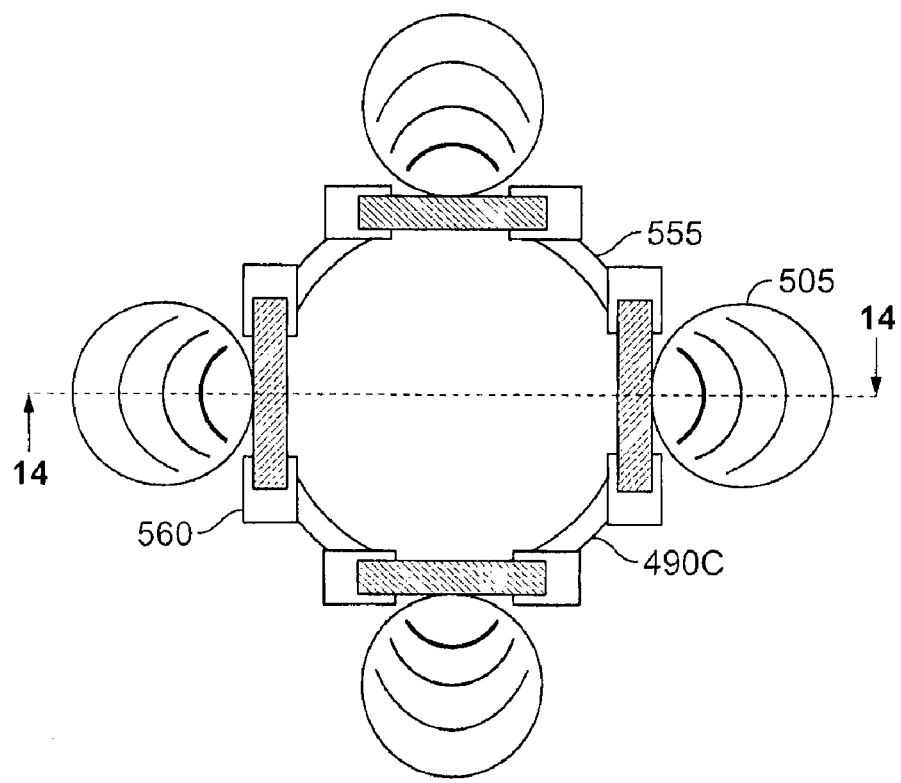
FIG. 15 is a partial section view (along line 14-14 of FIG. 14) of a waveguide capable of being used in the RF or microwave reactor of FIG. 8.

Referring now to FIGS. 14 and 15, FIG. 14 is a partial, sectional view of a waveguide 490C along line 14-14 of FIG. 15, and FIG. 15 is a sectional view of the waveguide 490C along line 15-15 of FIG. 14. The waveguide 490C can be used in the reactor 430 of FIG. 8. The waveguide 490C includes a gaseous or non-gaseous (e.g., quartz, alumina, silica, boron nitride, Teflon, or other microwave transparent or translucent material) dielectric 550 disposed in a conductive wall 555 of the waveguide 490C. The waveguide 490C further includes a plurality of launches integrally coupled with the wall. The launches take the form of windows (window 560 is shown in FIGS. 14 and 15) that allow the microwave energy to propagate through the windows 560 and launch into the reaction mixture. It is also envisioned that the waveguides 490C can use projections (e.g., metallic or dielectric antennas) in place of or in addition to the windows 560 for launching the microwave energy into the chamber 445.

In yet another envisioned construction, the microwave reactor can include guides and launches disposed at least partially within the chamber for launching microwave energy into the chamber, and further can include launches supported by the vessel wall for launching additional microwave energy into the chamber.

As has been disclosed above, the launches launch electromagnetic energy from a guide into a chamber's reaction mixture. The electromagnetic energy coupled or radiated into the chamber has a penetration depth (typically referred as 1/e) for active E&M fields. The penetration depth is represented in various above-discussed figures by spheres. It has also been disclosed above, that the properties of the launches (e.g., shape, type, composition, etc.), among other things, affect the radiation pattern (including depth) for the active E&M fields. Various constructions of the launches will be discussed in further detail below.

Referring back to FIG. 4, a schematic, sectional view of the launch 300 is shown in FIG. 4. The launch 300 includes the metallic projection rod 303, which may be part of the center conductor 305 of a coaxial cable or waveguide connector. Optionally the metallic projection rod 303 can be suitably attached for example by a screw thread to the center conductor 305. The coaxial cable conductor includes the conductor 315 (e.g., a braided conductor), the dielectric insulator 320, and the center conductor 305. The metallic projection rod 303 extends beyond the dielectric insulator 320 and the conductor 315, such that the projection rod 303 acts like the projection rod 255 discussed above.

Figure 16:
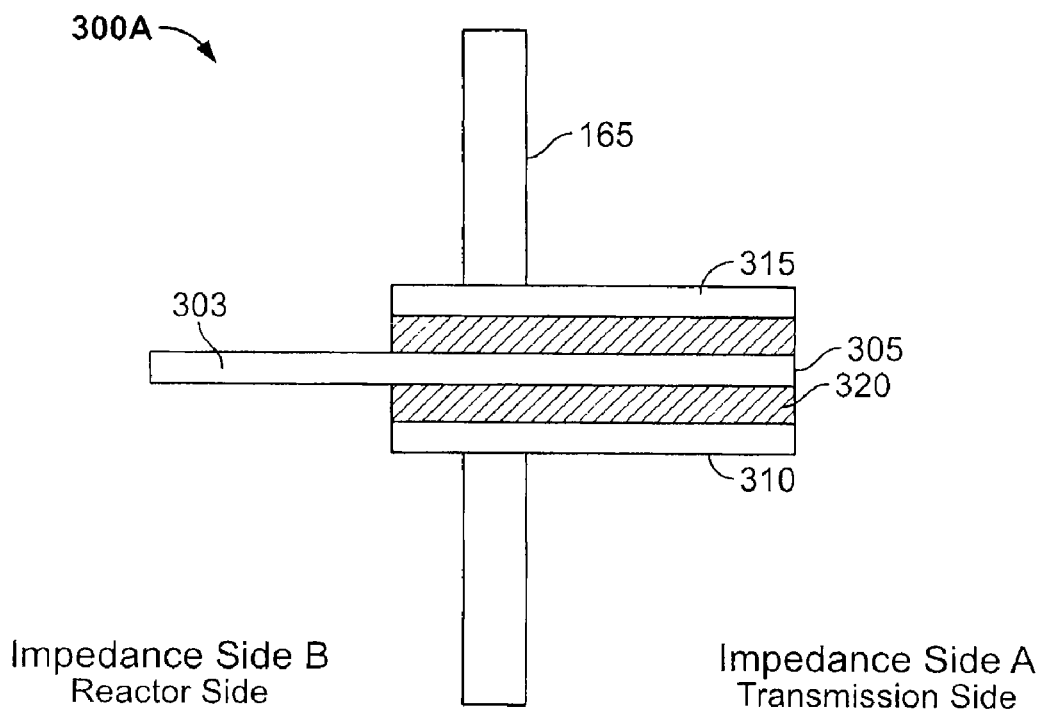
FIGS. 16-22 are schematic, sectional views of launches capable of being used in the RF or microwave reactor of FIG. 1.

FIG. 16 is a schematic, sectional view of the launch 300A. For FIG. 16, the conductor 315 and the dielectric insulator 320 extend past the wall 165. One reason for extending the conductor 315 and the dielectric insulator 320 is to promote the sealing of the launch 300A with the wall 165. Another reason is to promote field shaping of the active E&M fields. As can be seen in FIG. 16, projection rod 303 is displaced from the wall 165, as compared to the projection rod 303 of FIG. 4, thereby creating differing effects for the E&M fields of FIGS. 4 and 16, such as controlling dead zones.

Figure 17:
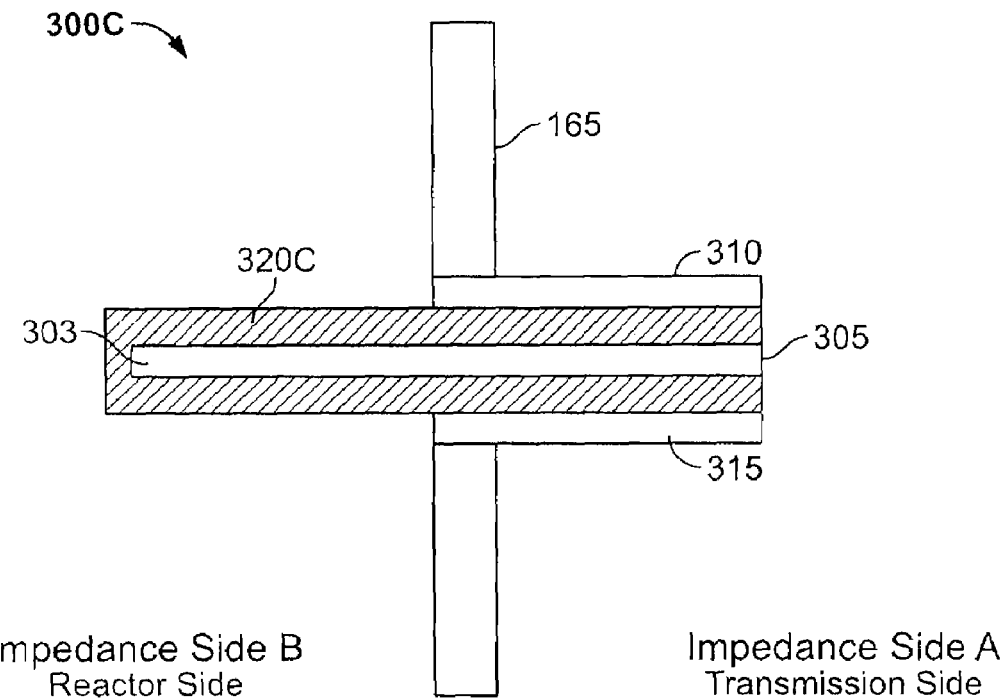

FIG. 17 is a schematic, sectional view of the launch 300C. The launch 300C includes a metallic projection rod 303, which is part of the center conductor 305 of a coaxial cable 310. The coaxial cable connector 310 includes a conductor 315 (e.g., a braided conductor), a dielectric insulator 320C, and the center conductor 305. The coaxial cable connector 310 is supported by a wall such as the vessel shell 165. The center conductor 305 extends beyond the conductor 315, such that the projection rod 303 acts like the projection rod 255 discussed above. However, unlike the projection rods discussed thus far, the projection rod 303 is at least partially surrounded by the dielectric insulator 320C (FIG. 17 shows the dielectric insulator completely surrounding the projection rod 303). The coaxial cable connector 310 propagates electromagnetic energy through the cable connector 310, resulting in the projection rod 303 radiating an electromagnetic field on impedance side B. Therefore, the projection of FIG. 17 can be viewed as a metallic antenna with a dielectric at least partially surrounding the metallic antenna.

One reason for surrounding the projection rod 303 with the dielectric insulator 320C is to protect the projection rod 303 from physical damage and/or chemical damage. Another reason for at least partially surrounding the projection rod 303 with the dielectric insulator 320C is to promote field shaping of the active E&M fields. Adding the dielectric material around the projection rod (as compared to FIG. 4), changes the properties of the antenna-like effect of the projection rod 303, and therefore, changes the shape of the active E&M fields. For example, the depth and geometrical shape of the sphere 1/e change in response to the addition of the dielectric material. Yet another reason for surrounding the projection rod 303 with the dielectric insulator 320C is to limit hot spot formation by the projection rod 603. The likelihood a hot spot surrounds the projection can decrease when a dielectric insulator surrounds the projection rod 303 and extends at least some of the electromagnetic energy and reduces the power density. It is also envisioned that the dielectric insulator may be used to at least partially heat the reaction mixture by convectional heat if the dielectric is lossy or a partial absorber of electromagnetic energy.

Figure 18:
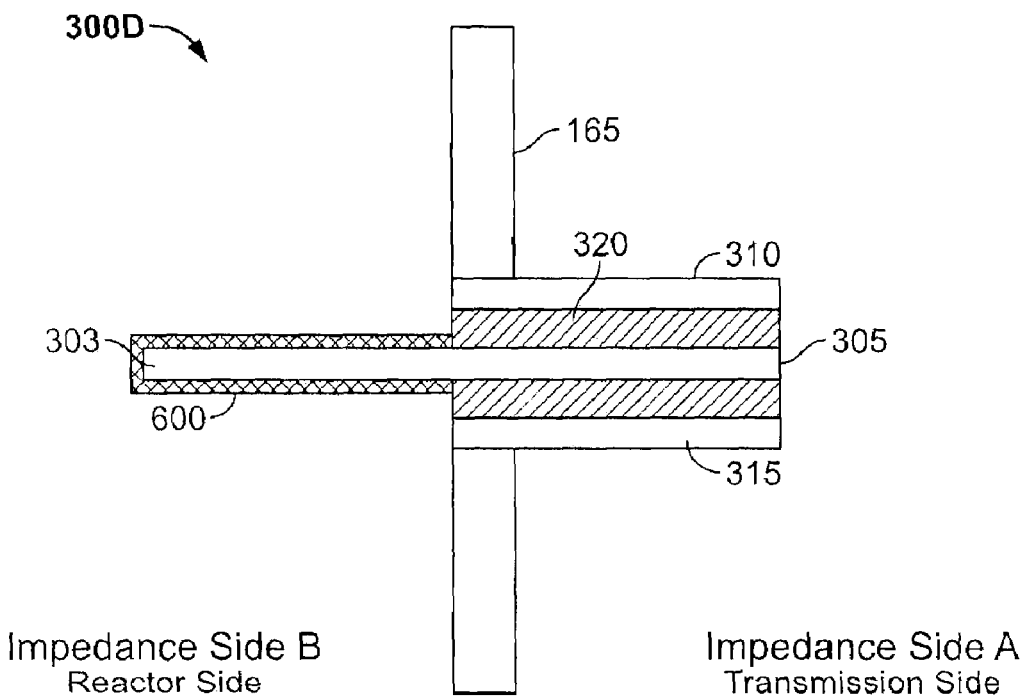

FIG. 18 is a schematic, sectional view of the launch 300D. Similar to the launch 300C, the projection rod 303 of launch 300D is at least partially surrounded by a dielectric material 600. In one construction, the dielectric material 600 is different from the dielectric insulator 320 and is microwave transparent. The coaxial cable 300D propagates electromagnetic energy through the cable connector 310, resulting in the projection rod 303 radiating an electromagnetic field on impedance side B. Therefore, the launch 300D of FIG. 18 can be viewed as a metallic antenna with a dielectric at least partially surrounding the metallic antenna.

Similar to FIG. 17, one reason for surrounding the projection rod 303 with the dielectric material 600 is to protect the projection rod 303 from physical damage and/or chemical damage. Another reason for at least partially surrounding the projection rod 303 with the dielectric material 600 is to promote field shaping of the active E&M fields. Similar to FIG. 17, adding the dielectric material 600 around the projection rod 303 changes the properties of the antenna-like effect of the projection rod 303, and therefore, changes the shape of the active E&M fields. For example, the depth and geometrical shape of the sphere 1/e change in response to the addition of the dielectric material 600. Moreover, varying the geometry (e.g., the shape) and the properties (e.g., the loss tangent) of the dielectric material 600 further shapes the active E&M fields. Yet another reason for surrounding the projection rod 303 with the dielectric material 600 is to limit hot spot formation. The control of hot spot formation also relates to the varying of the geometry and the properties of the dielectric material 600. Example dielectric materials 600 include Teflon®, quartz, glass, plastic, ceramic, and similar substantially lossless materials having a loss tangent less than 0.1, with a preferable loss tangent less than 0.01. However, dielectric materials with greater loss tangents may be used if the projection is used for heating.

The dielectric parameter called the loss tangent is known by those skilled in the art to measure the relative RF or microwave energy that a particular material absorbs at a given frequency. The loss tangent, also related to the loss factor, is the ratio of the energy lost to the energy stored. A larger loss tangent for a material means that more energy is absorbed relative to a material with a lower loss tangent. The dielectric absorption of energy can cause different materials to heat at substantially different rates and to achieve considerably different temperatures within the same RF or microwave field.

Figure 19:
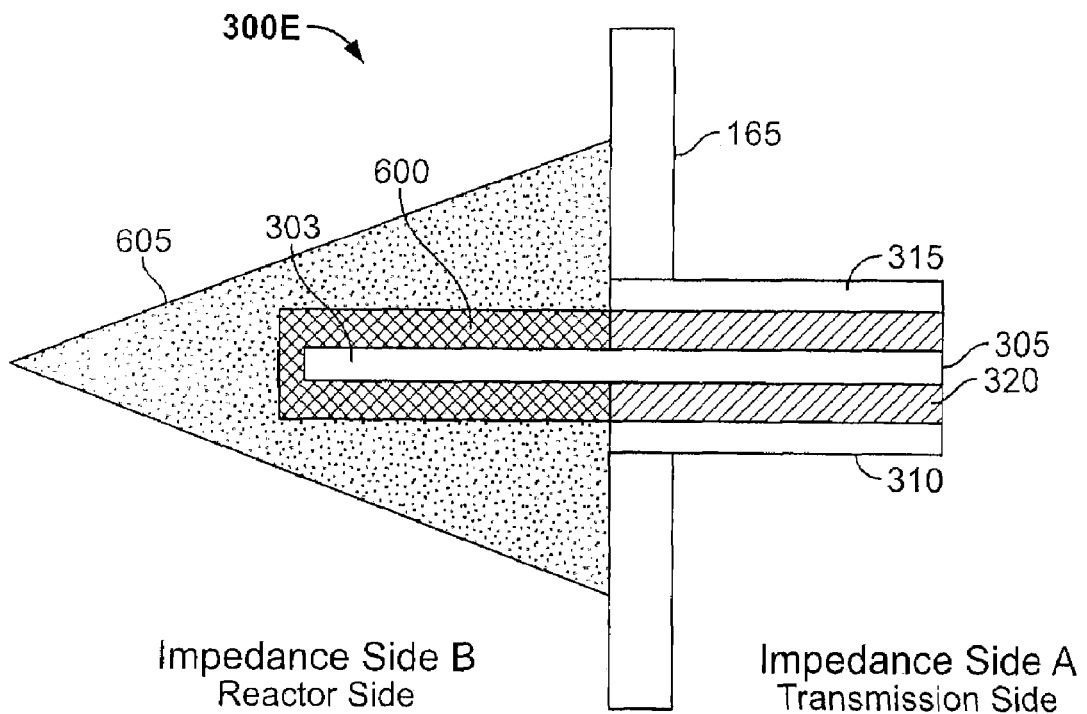

FIG. 19 is a schematic, sectional view of the launch 300E. For FIG. 19, the launch 300E includes the projection rod 303, a first dielectric material 600, and a second dielectric material 605. That is, the launch 300E includes a projection rod 303 and a plurality of dielectric materials 600 and 605. The use of a plurality of dielectric materials 600 and 605 and the geometrical shape of the materials 600 and 605 further promote the shape of the active E&M fields and limit hot spot formation.

Figure 20:
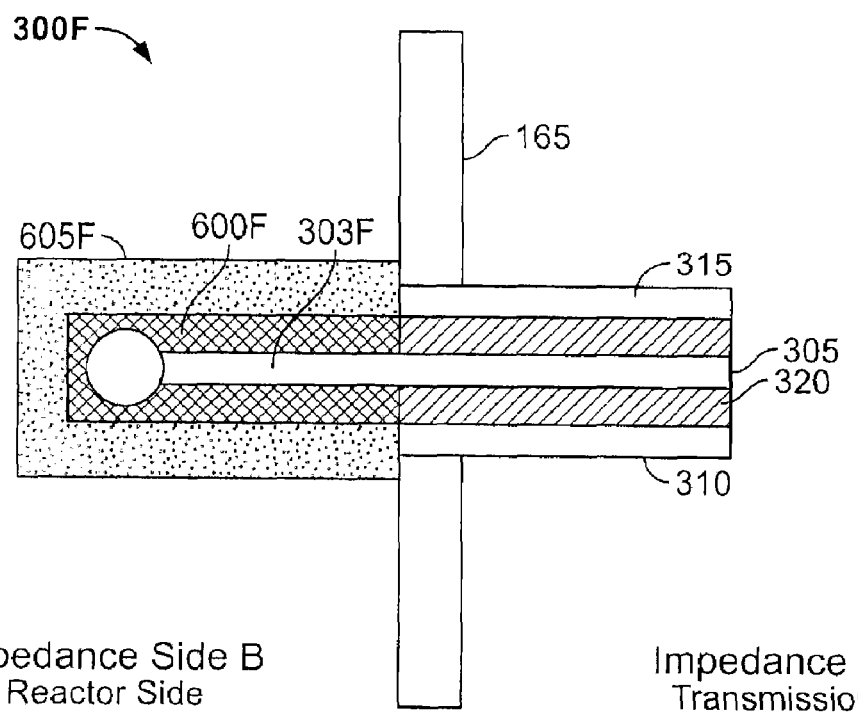
Figure 21:
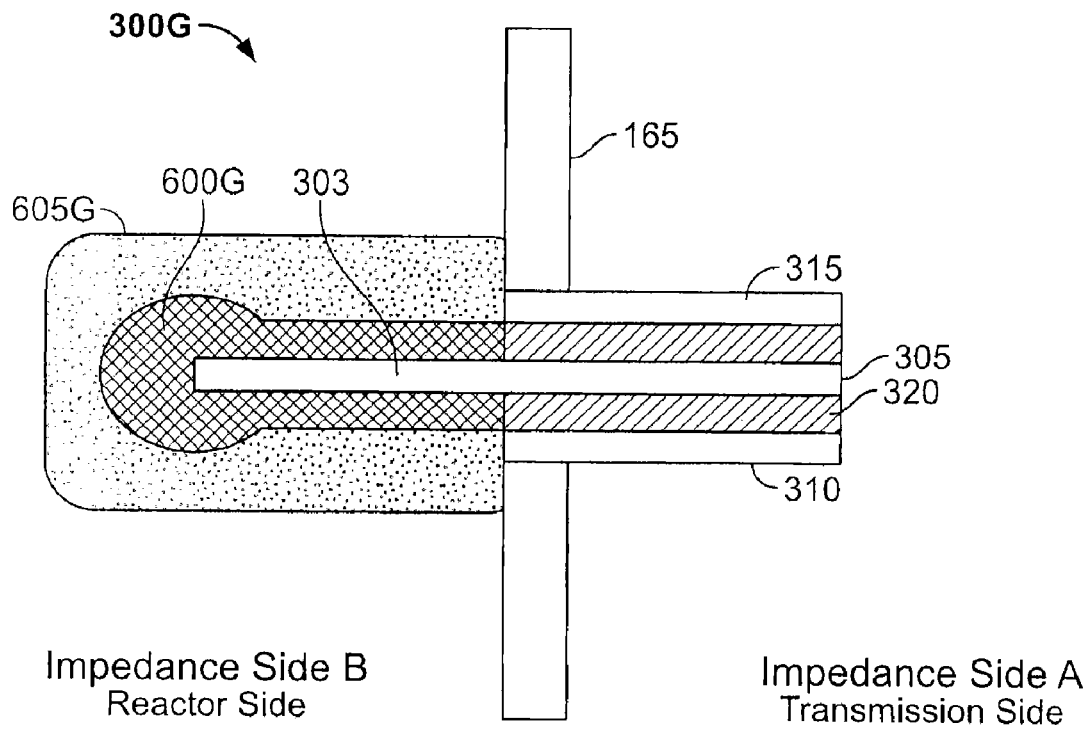

FIG. 20 is a schematic, sectional view of the launch 300F. For FIG. 20, the launch 300F includes a hybrid projection rod 303F having a varying shape from previous projection rods, a first dielectric material 600F, and a second dielectric material 605F. FIG. 21 is a schematic, sectional view of the launch 300G. For FIG. 21, the launch 300G includes a projection rod 303, a first dielectric material 600G having a first non-uniform shape, and a second dielectric material 605G having a second non-uniform shape. The use of differing geometrical shapes for the projection rod, the use of one or more dielectric materials, and/or the use of differing geometrical shapes and properties of the one or more materials further promote the shaping of the active E&M fields and the possible control of hot spot formation.

Figure 22:
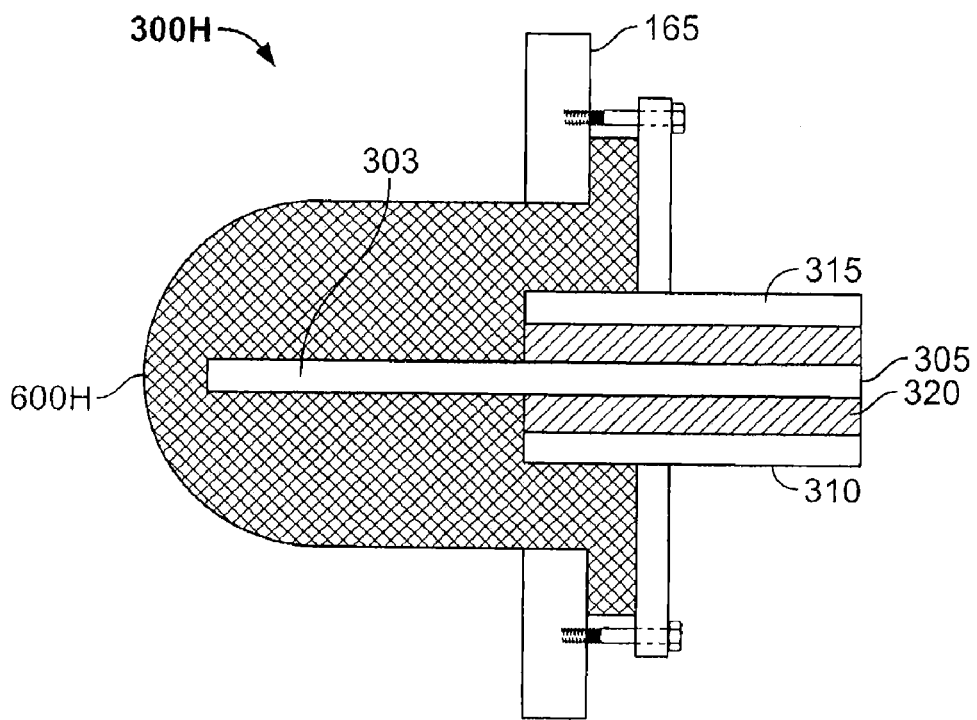

FIG. 22 is a schematic, sectional view of the launch 300H being coupled to the vessel 165 by dielectric material 600H. In addition to the already discussed possible benefits of using a dielectric material to at least partially surround the projection rod 303, the dielectric material 600H can be used to provide a better seal between the coaxial cable 303 and the vessel 165. A fastener can be used to secure the coaxial cable to the vessel wall, and compress the dielectric material 600H. For example, launch 300H can include a flange 610 having apertures 615 for receiving a plurality of fasteners 615 (e.g., bolts) where the flange 610 can compress the dielectric material 600H. Additionally, RF seals or gaskets know to those skilled in the art can be added to minimize any potential leakage of electromagnetic energy.

Before proceeding further, while the above launches 300A-300H were described based on the launch 300, the concepts can also apply to launch 250. The portion of the projection rod 355 on the reactor side can also be modified based on the concepts disclosed in FIGS. 18-21. It is also envisioned that the projection rods 255 and 303 can be at least partially surrounded by one or more layers of a second metallic material, the projection rods 255 and 303 can be made of a dielectric materials, and other combinations of metallic and dielectric layers can be used.

Method of Designing a Reactor

As discussed above, when a projection is inserted into a waveguide and supplied with microwave energy, it generally acts as an antenna, for example a quarter-wave antenna. The size, shape, and composition of the projection determine its frequency, bandwidth, and power-handling capability. The location and geometry of the projection in relation to the surrounding dielectric media and space-volume geometry help determine the energy transfer efficiency. In order to obtain the desired energy transfer efficiency and desired field distribution inside the microwave reactor, one can design and optimize the projection geometry, composition, and location, and design and optimize the geometry (space-volume) of the reactor in relation to the projection and the complex dielectric values of the materials within the reactor.

One representative method to design a reactor is provided below. Other methods do not require all the steps below, can include additional steps not described herein, and/or can vary the order of the steps.

1. Determine desired process-rate or flow rate, for example, bbl/day or bbl/hour.
2. Determine the acceptable space-velocity for the system (catalyst and reactor configuration).
3. Determine the required volume for the reactor.
4. Determine any liquid or fluid-flow velocity constraints & fix range of fluid velocity.
5. Determine required microwave power/energy density (e.g., watts/cc) or electromagnetic field strength (e.g., volts/meter).
6. Determine dielectric properties of all species (reactants—at different conversions; catalyst—both fresh and assorted ages). Dielectric properties usually vary as a function of temperature, operating conditions, and the degree of completion for the desired reaction, as well as for coking and general catalyst ageing.
7. Determine (approximate calculations and later modeling) the microwave power penetration depth for the full range of operating conditions.
8. Determine desired or acceptable E&M field profile & degree of required field uniformity.
9. Determine frequency to be used.
10. Determine E&M model distribution (fit the E&M modes into the reactor volume by adjusting the dimensions; l/e power distribution guideline for field energy decay).
11. Approximate or use more precise finite element modeling of the system, and distribute and re-inject microwave power to achieve total volume and E&M field profile requirements.
12. Use symmetry wherever possible to simplify scalability/expandability.

Method of Designing Projections

The design basis disclosed in this section is primarily directed to projections. However, the design basis can also utilize a transparent or RF/microwave-permeable window or aperture concept.

The concept of "matching" is to efficiently couple or to transfer power or energy from a source through one of several types of transmission means or lines and finally into a load, the load being the consumer of the power or energy. In order to achieve the theoretically perfect coupling efficiency of 100%, the magnitude of the complex electrical impedance of the power source typically should first equal or match the magnitude of the complex electrical impedance of the transmission line, which in turn typically should equal or match the magnitude of the complex electrical impedance of the load. One characteristic of a transmission line or means is that it does not dissipate or lose appreciable energy. Similarly, one characteristic of the load is that it efficiently utilizes or absorbs all of the energy delivered to it.

It is also typically preferable to control the amount or percentage of energy being coupled or transmitted, while at the same time controlling or minimizing the reflected power. This is particularly useful to control the distribution of energy through or into several points or volumes. It may also be desirable to control the mutual coupling between the launches to minimize or control the reflected power. Mutual coupling, which is the influence that one launch has on another, can be controlled by several techniques, such as adjusting the spacing between launches, adjusting launch or reactor geometry, or adjusting dielectric properties.

Generally, these teachings show a systematic methodology to match, or to efficiently couple, the energy of an RF or microwave frequency source impedance (complex impedance) into nearly any volume of reactor geometry, which may have its own unique complex RF or microwave impedance. Additionally, the teachings generally show a methodology or means to distribute or to divide the power throughout the volume of the reactor, which comprises the load.

For an example, start with a 50 ohm RF or microwave source if coaxial cable is used to convey power to the reactor. Similarly, begin with the characteristic (complex) impedance of the dielectric waveguide if a waveguide transmission line is utilized as the transmission line and means into the reactor. The RF/microwave source impedance to be matched is generally split into multiples and configured into a repeatable, extendable, or scalable fashion in order to distribute the microwave power into the reactor at the desired power density throughout the desired reactor volume. One method for designing the injectors for this example is discussed below. Other suitable methods may not require all the steps below, and can include additional steps not described herein, and/or can vary the order of the steps.

Figure 23:
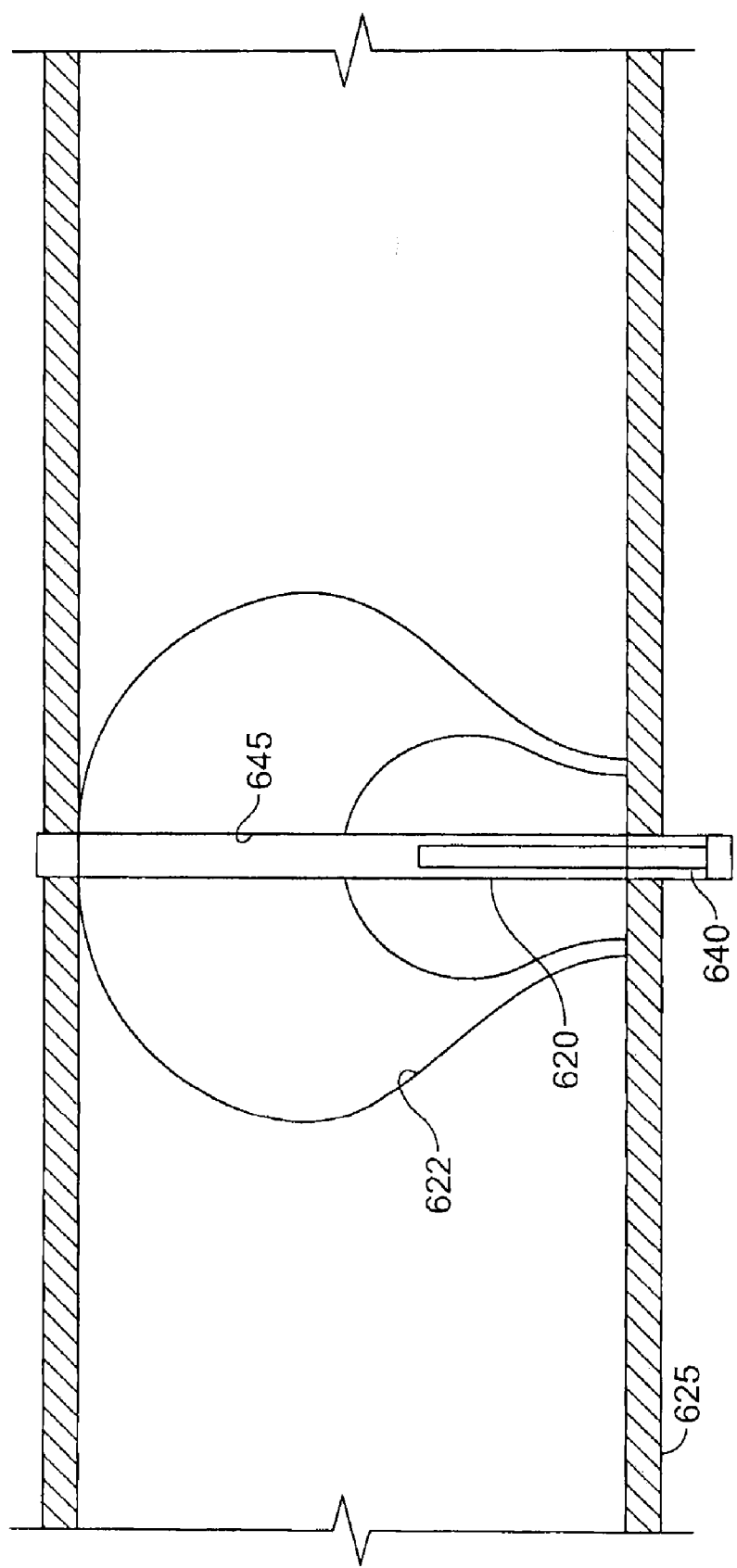
FIG. 23 is a schematic, sectional view showing a projection having an electromagnetic power density penetration depth.

1. Determine frequency (fixed or range) to be used.
2. Determine maximum power to be applied through each projection point.
3. Either (a) mathematically approximate or more precisely (b) utilize finite element modeling of the system specifically from the microwave transmission line/source, through or between the reactor wall, and then into the reactor volume to optimize power transfer. FIG. 23, for example, represents a single projection 620 having a targeted l/e power density 622 into a vessel 625. Calculate forward and reflected power of each projection; control the geometry of the projection to govern and to control the fraction of the desired transmitted forward power and to generally minimize the reflected power including the mutual coupling. One side of the projection's equivalent geometry should match the impedance of transmission line/coax and the second side of the projection's equivalent geometry can be designed to match the impedance of the reactor load, for example comprising the reactants and/or catalyst.

4. Using one of a variety of conductive, dielectric, insulating, or combinations of rod or projection geometries, a coaxial transmission electromagnetic finite-element model can be used (finite element modeling or approximated calculations) to evaluate and to adjust rod geometries with respect to the relative insulators, dielectrics, and conducting surfaces of the neighboring and intersecting materials. Proper control of pin or projection geometry parameters, such as lengths and one or more diameter configurations, allows one skilled in the art to match the RF/microwave complex impedance of the reactor volume geometry with that of the transmission line/ means, and similarly with the source.

5. Proper repetition of this projection design in conjunction with considerations/modeling/adjustments of the resulting internal E&M field structure, due to geometrical placement of the projection in and around the reactor, results in efficient distribution and coupling of the microwave power into the reactor at the desired power density and with the acceptable field uniformity and into the desired reactor volume.

In one embodiment, the invention allows the use of multiple power injection points into the reactor or the re-injection of microwave power to suitably distribute (in a controlled fashion and designable power-density) the energy/power into the volume of the reactor. It is typically preferable for the power distribution to be as uniform as possible. Exceptions, such as to induce a high thermal gradient(s) across the catalyst and reactor volume, are also possible to suit the needs of the specific application.

Figure 24:
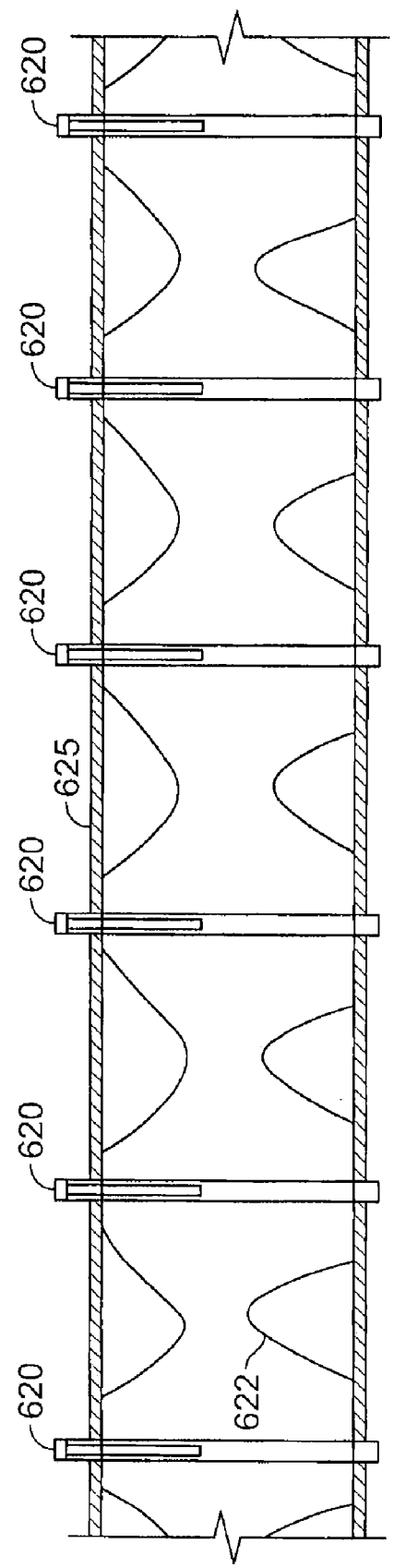
FIG. 24 is a schematic, sectional view showing a plurality of projections having an electromagnetic power density penetration depth.

The fit of the overlapping E&M fields, or modes, within the reactor volume can be controlled by adjusting the dimensions of the projection, reactor cavity, geometrical spacing, or other component placements. For example, FIG. 24 represents a plurality of projections 620 in a vessel 625, where the approximate targeted l/e power density 622 provides a suitable filling of the active E&M fields using a plurality of projections. The distribution of the E&M fields can initially be approximated and then controlled and fine-tuned by using a spherical shell or other approximation for the 1/e field decay as a guideline for the volume to overlap or to re-inject additional power into the reactor/applicator. The penetration depth, 1/e, is used to denote the depth at which the power density has decreased to 37% of its initial value at the surface. Approximate or more precise finite element modeling of the system can be used to distribute and re-inject microwave power to achieve the total volume and E&M field profile requirements.

Symmetrical projection placement within or around the reactor volume can simplify and considerably extend the scalability and expandability of the usable reactor volume. For example, in FIGS. 14 and 15, a spherical packing density of overlapping E&M microwave fields can be symmetrically arranged within the reactor by arranging a spiral-wrapped configuration of projection/launches around the internal transmission line distributor design.

Example of Microwave Reactor Design for a Biodiesel Production Process

It is known that the transesterification processes is useful for converting plant oils and/or animal fats into alkyl esters, also known as biodiesel. In U.S. Patent Publication No. 2005/0274065, the content of which is incorporated herein by reference, it is disclosed that the use of microwave energy is beneficial to the transesterification process. The example herein provides a method to design a microwave chemical reactor for the production of biodiesel via a transesterification reaction. The reactor can be designed as a fixed bed heterogeneous catalytic process, a homogeneous process, or the combination of the two. The reactor can also be designed to perform the esterification process per U.S. Patent Publication No. 2005/0274065.

The design process takes into account both unique E&M field properties developed by the reactants, product, and catalysts used in the transesterification process, and process operating parameters such as temperature, pressure, LHSV, microwave power density, and desired production rates (e.g. liters/hr, bbl/day). To design a reactor, one guiding principle is to determine E&M fields that develop during this process and calculate a 1/e power penetration depth for E&M field energy decay. For example, the penetration depth can be determined graphically using finite element modeling techniques or calculated by other means such as shown in equation [e1]. This allows the reactor geometry to be adjusted to fit the E&M modes into the reactor volume.

$$\text{Penetration Depth} = (\lambda_o \times (\in_r')^{1/2}) \div (2 \times \pi \times \in_r'') \qquad [\text{e1}]$$

where $\lambda_o$ wavelength, measured in, $\lambda_o = c \div f$
f frequency, measured in Hz
$\in_r'$ relative dielectric constant
$\in_r''$ relative dielectric loss
c speed of light
tan δ loss tangent equal to $\in_r'' \div \in_r'$
δ dielectric loss angle, measured in degrees The fit of the overlapping E&M fields, or modes, within the reactor volume can be controlled by several means including adjusting the dimensions of the launch/injector, reactor cavity, geometrical spacing, or other component placements. The distribution of the E&M fields can initially be approximated, and then controlled and fine-tuned by using the 1/e field decay or penetration depth as a guideline for the important dimension to overlap or to re-inject additional power into the reactor.

For this example, a finite element model (FEM) can be employed to evaluate the geometry of the system and to distribute and launch microwave power to fill the desired total reactor volume and meet E&M field profile requirements. Reactor geometry symmetry wherever possible, can be used to simplify scalability and expandability. Other methods to achieve approximate or less precise solutions exist.

One of the initial steps to take is to measure the dielectric properties, i.e. the complex dielectric permittivity and permeability, at process operating conditions, of the reactant mixture (e.g. alcohol, plant oil, and catalyst (homogeneous or heterogeneous), the product mixture (e.g. methyl esters, glycerin, and alcohol), and a few data points relating to the mixtures developed at different stages of the process (e.g. alcohol, plant oil, methyl esters, glycerin, and catalyst). It is known to those skilled in the art that dielectric parameters are generally frequency and temperature dependent. Therefore, dielectric properties of the reactant and product mixture, including any catalysts, should be determined at or around the frequency of the microwave or RF source to be used for the process and at or around the process temperatures.

Commercial high power sources are available primarily at 915 MHz (e.g. above 30 kW). Lower and moderate power sources (e.g. below 10 kW) are more commonly available in the 2.45 GHz frequency. It is also known to those skilled in the art that the penetration depth (1/e) changes as a function of wavelength. As a first order approximation, at 915 MHz, the penetration depth would reduce by more than 60% (e.g. 915÷2450) if a 2.45 GHz microwave source was used. Based on this consideration, the reactor sizing can be designed to work with either a 2.45 GHz or a 915 MHz microwave source. For this example the 915 MHz source was selected. Also to be determined at this step is the maximum microwave power to be applied through each launch based on the process microwave chemistry requirements. The required microwave power density that is sufficient to promote/effect the reaction or process can be determined by experimental or other means. For example, in one system, U.S. Patent Publication No. 2005/0274065, it was experimentally determined that approximately one watt/cc was useful to promote the biodiesel process. To achieve the targeted power density calculate or use FEM methods to evaluate the required power to be injected into each launch. For this example, it was determined that a useful injected power was about 1000-1500 watt. FEM evaluations used 1500 watts per launch to achieve the targeted power density of one watt/cc.

Figure 29:
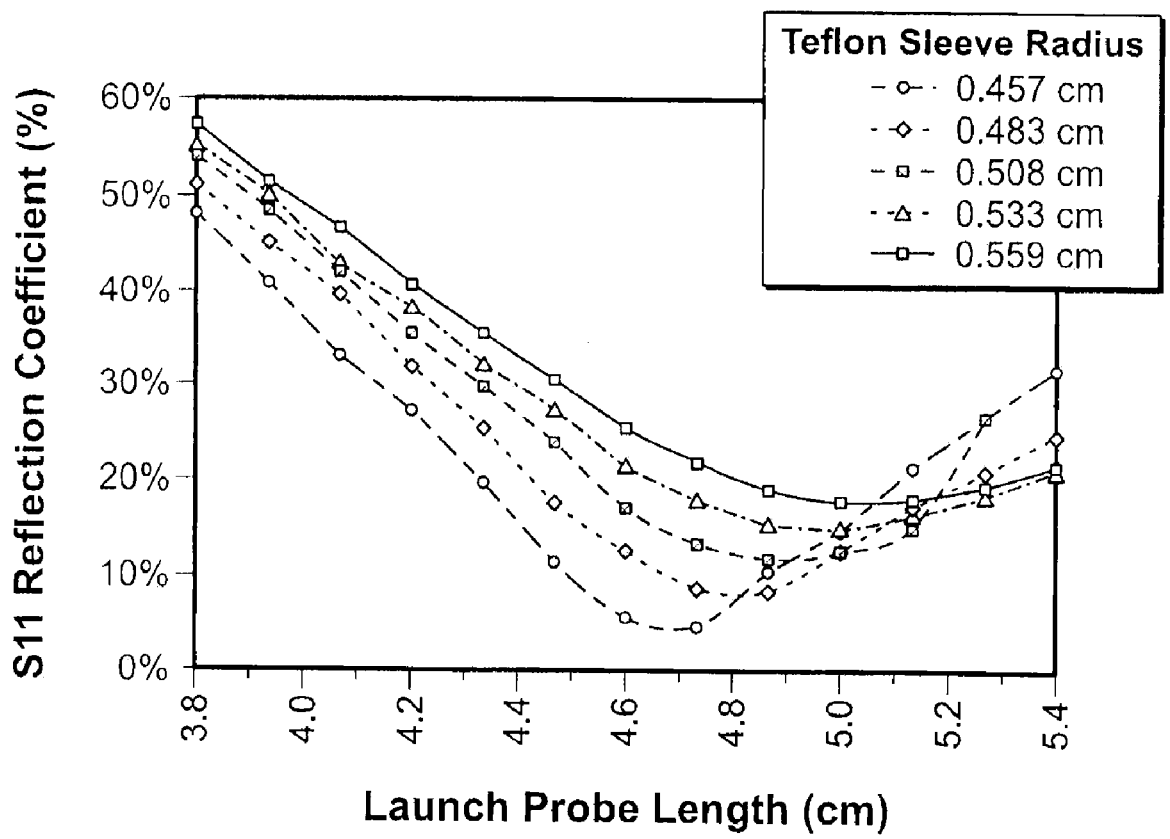
FIG. 29 is a plot of the S11 reflection coefficient versus the launch probe length

A next step is to optimize the launch geometry at the selected frequency to achieve the desired impedance (e.g. 50 ohms) and to minimize the reflected power, characterized by the S11 parameter. S11 is the input port voltage reflection coefficient. FIG. 29 shows a plot of the S11 reflection coefficient versus the launch probe length. Plotted are various geometries where the radius of the Teflon sleeve is changed to determine the optimum metal probe and Teflon sleeve geometry. It can be seen that a minimum S11 reflected power is achieved for this range of geometries. This achieves at least 95% efficient coupling as shown, for example, in FIG. 29.

The field structure around the launch was then modeled and evaluated as shown in FIG. 23. With reference to FIG. 23, the launch 620 includes a metal projection rod 640 surrounded by Teflon sleeve 645. A portion of the rod 640 and sleeve 645 are disposed in the chamber 625. The data from the plot determines the 1/e power distribution as a function of distance away from the launch. The 1/e distance provides a guideline (e.g. spacing equals twice the 1/e spacing) for spacing multiple launches to maintain a desired power density average or to maintain the power density equal to or greater than a chosen value to be contained within the 1/e field space. For biodiesel production, at 915 MHz, the 1/e distance averages around 15.7 cm. At the entrance and exit of the cylindrical reactor, improved performance can be obtained by considering the reflection boundary condition between the metallic wall and the launch. Specifically, it is useful to use the following guideline to determine the distance from the launch to the end of the reactor. Start by locating the launch one-quarter wavelength away from the end of the reactor. Furthermore, one can fine-tune the launch placement by minimizing S11. For the biodiesel example, this distance was determined to be 5.33 cm.

Usually, process chemistry makes it desirable for the microwave power distribution to be as uniform as possible or at least greater than a functional minimum. Exceptions, such as to induce a high thermal gradient(s) across the catalyst and reactor volume, are also possible if required for a specific application.

Because the operating temperatures and pressure conditions are relatively mild for transesterification (e.g. under 150 psig, 150° C.), a launch made with Teflon as the dielectric insulator can be used. This lowers the cost compared to a glass/ceramic dielectric insulator that can handle higher operating temperatures. In one example, the launch probe diameter is 0.48 cm. To provide mechanical support to the launch, as well as to provide chemical protection, a Teflon sleeve was fitted over the launch.

For this example, comprising a tube reactor (e.g. circular geometry), the penetration depth guides the selection of the diameter of the reactor. This is done such that the cross sectional area contains the 1/e field space without significant voids. FIG. 24 shows the fields for multiple launches 620 so as to extend the average field intensity, contained within the 1/e field space. By using calculations or modeling, one can determine the mutual coupling between launches and adjust the geometries as necessary. A suitable tube diameter was determined to be about 12.2 cm. The process rate conditions, LHSV, can be used to determine the reactor tube length. For a desired LHSV of 80, and a desire process rate of 2270 liters/hr, a reactor volume of 28.4 liters is needed. Given this reactor volume and a reactor diameter of 12.2 cm, the reactor length is calculated to be approximately 2.43 m. A reactor built according to this design is able to couple microwaves efficiently into biodiesel reactants such as soybean oil and methanol and biodiesel products, methyl esters and glycerin. Therefore, the spacing of the launch design can be used as a means of controlling the residence time (1/LHSV) of the reactor. The repetition of the launch with a suitable spacing and field overlap is also a means of maintaining controlled or uniform electromagnetic fields coupled into the reactant mixture while controlling the process residence time. Combining the teachings for intra-launch spacing and for boundary condition launch spacing (at reactor ends) 18 launches provides the optimum number of launches for the biodiesel reactor. However if only the intra-launch spacing consideration is used, 16 launches are suitable. In the 16-launch solution, an additional intra-launch spacing distance should be included on each end of the reactor to allow the field to decay before it is reflected internally from the end of the reactor and back to the launch.

Process sensitivity data can be used to further refine the launch impedance and geometry, launch spacing, and reactor geometry to accommodate variations in process conditions. For example, one could study how reflected power and the mutual coupling parameters change the required launch geometry and spacing as a function of changes in reactant and product mixtures, and other process parameters such as temperature. It is typically preferable to design the distribution of the electromagnetic energy inside the reactor to control a targeted average power or field strength and to minimize or reduce the dead zones. One way to control this field distribution is to suitably select the spacing between multiple launches and to utilize appropriate phases for each launch (relative to a common power source). Phase control can be one important parameter to understand because the total electric and magnetic fields inside the reactor are the superimposition of the electric and magnetic fields from each of the individual excitation sources.

As discussed previously, a general guideline for spacing multiple launches is in the range of approximately from a single 1/e distance (one penetration depth's distance) to twice the 1/e distance (two times the penetration depth) so as to achieve an average field or power density higher than 1/e (37%) of the desired field or power density. For cases that require greater average field uniformity or higher average field density, the launch spacing could be smaller than the 1/e distance, e.g. shorter than one penetration depth. In the example case for a biodiesel reactor, the complex permittivity for the catalyst and reactant mixture is approximately $\in'$=5.5, $\in''$=0.79, with a loss tangent=0.145. In this case, the target power density was 1 watt/cc. It was found that improved performance was obtained by placing the second (neighboring) launch 83% of the 1/e distance away, 13.1 cm, which is about one wavelength in the dielectric media, and making the phases of the (neighboring) launch input power 180 degree different from each other. For intra-launch spacing, the field structure can be controlled or improved by setting the phase angle of the S21 coupling coefficient to zero. S21 is the high frequency electromagnetic coupling coefficient between two nearby ports and can be thought of as a mutual coupling factor. This suitably minimized the dead zones and achieved the desired average power density. In this particular case, the superposition of the 180° phase difference positively reinforced the electromagnetic fields between the two (neighboring) launches. Another way to achieve the reinforcement of the electromagnetic fields and to maintain a more standard zero degrees phase shift between each launch's source power is by inserting the second launch at the same spacing but from the bottom of the reactor, e.g. 180 degrees around the circumference with respect to the first "0" degree launch.

The reactor design is not limited to this one process but can be used for many applications (e.g. oil/water separation, fossil fuel cracking, fossil fuel hydroprocessing, petrochemical, and pharmaceutical) by evaluating the different dielectric values (e.g. reactants, products, catalysts), and adjusting the launch geometry and spacing by using a suitable penetration depth and field profile. It should be noted, that other process conditions may need to be taken into consideration during the reactor design process such as liquid or fluid-flow velocity constraints, system thermal stability requirements and catalytic diffusion and kinetic factors.

Accordingly, the invention provides a new and useful processing apparatus with an electromagnetic launch. Various features and advantages of the invention are set forth in the following claims.

What is claimed is:

1. A processing apparatus comprising:
   a vessel including an inner surface defining a chamber configured to hold a reaction mixture, wherein the vessel further includes a port configured to introduce the reaction mixture, including at least one reactant and at least one catalyst, to the chamber and to release at least one product with or without the at least one catalyst from the chamber;
   a guide including a first portion that extends into the chamber and is at least partially in contact with the reaction mixture, the guide being configured to propagate electromagnetic energy;
   a first launch supported by the guide and disposed at least partially within the vessel, the first launch including a second portion that is in contact with the reaction mixture, the first launch being configured to launch a first portion of the electromagnetic energy from the guide into the reaction mixture; and
   a second launch supported by the guide and including a third portion that extends into the chamber and that is in contact with the reaction mixture, the second launch configured to launch a second portion of the electromagnetic energy from the guide into the reaction mixture.

2. The apparatus of claim 1, wherein the vessel further includes a fixed bed to receive a heterogeneous catalyst.

3. The apparatus of claim 1, wherein the vessel includes an aperture, and the guide is at least partially disposed in the aperture.

4. The apparatus of claim 1, wherein the guide includes a dielectric-filled waveguide at least partially disposed within the vessel, and wherein the first launch is supported by the dielectric-filled waveguide.

5. The apparatus of claim 4, wherein the apparatus further comprises a radio frequency (RF) generator coupled to the dielectric-filled waveguide to propagate RF energy through the dielectric-filled waveguide.

6. The apparatus of claim 1, wherein the first launch includes a dielectric window.

7. The apparatus of claim 1, wherein the first launch includes a projection.

8. The apparatus of claim 7, wherein the projection includes a metallic projection.

9. The apparatus of claim 8, wherein the projection further includes a dielectric material at least partially surrounding the metallic projection.

10. The apparatus of claim 1, wherein the first launch includes a dielectric projection.

11. The apparatus of claim 10, wherein the first launch further includes a second dielectric material at least partially surrounding the dielectric projection.

12. The apparatus of claim 1, further comprising
    a second guide including a fourth portion that extends into the chamber and is at least partially in contact with the reaction mixture, the second guide being configured to propagate electromagnetic energy; and
    wherein the second guide supports the second launch.

13. The apparatus of claim 1, wherein the first launch is integrally coupled with the guide.

14. The apparatus of claim 1, wherein the reaction mixture has a loss tangent, and wherein the first launch has a coupling efficiency into the reaction mixture, the coupling efficiency being greater than approximately 80 percent.

15. The apparatus of claim 14, wherein the coupling efficiency is greater than approximately 95 percent.

16. The apparatus of claim 14, wherein the loss tangent is less than 0.1.

17. A processing apparatus comprising:
    a vessel including an inner surface defining a chamber configured to hold a reaction mixture, wherein the vessel further includes a port configured to introduce the reaction mixture, including at least one reactant and at least one catalyst to the chamber, and to release at least one product with or without the at least one catalyst from the chamber;
    a guide configured to propagate electromagnetic energy; and
    a first launch and a second launch coupled to the guide and including a respective portion that extends into the chamber and is in contact with the reaction mixture, each of the first launch and the second launch being configured to couple a portion of the electromagnetic energy from the guide into the reaction mixture.

18. The apparatus of claim 17, wherein the first launch includes a first metallic projection and the second launch includes a second metallic projection.

19. The apparatus of claim 18, wherein the guide includes a dielectric-filled waveguide, and wherein the first metallic projection and the second metallic projection are coupled to the dielectric-filled waveguide.

20. The apparatus of claim 19, wherein the apparatus further comprises a RF generator coupled to the dielectric-filled waveguide to propagate RF energy through the dielectric-filled waveguide.

21. The apparatus of claim 18, wherein the apparatus further comprises an electromagnetic generator, wherein the guide includes a first guide and a second guide coupled to the electromagnetic generator, and wherein the first guide includes the first metallic projection and the second guide includes the second metallic projection.

22. The apparatus of claim 21, wherein the electromagnetic generator includes a first electromagnetic generator coupled to the first guide and a second electromagnetic generator coupled to the second guide.

23. The apparatus of claim 18, wherein the apparatus further comprises an electromagnetic generator and a distributor coupled to the electromagnetic generator, wherein the guide includes a first guide and a second guide, wherein the first guide includes the first metallic projection and the second guide includes the second metallic projection.

24. A processing apparatus comprising:
a vessel including an inner surface defining a chamber configured to hold a reaction mixture;
a first guide configured to propagate electromagnetic energy;
a first metallic projection and a second metallic projection coupled to the first guide and including a respective portion that extends into the chamber and is in contact with the reaction mixture, each of the first metallic projection and the second metallic projection being configured to couple a portion of the electromagnetic energy from the first guide into the reaction mixture;
a second guide configured to propagate electromagnetic energy; and
a third metallic projection and a fourth metallic projection coupled to the second guide and including a respective portion that extends into the chamber and is in contact with the reaction mixture, each of the third metallic projection and the fourth metallic projection being configured to couple a portion of the electromagnetic energy from the second guide into the reaction mixture.

25. The apparatus of claim 18, further comprising a dielectric material at least partially surrounding the first metallic projection.

26. The apparatus of claim 17, wherein the guide is disposed outside of the vessel.

27. The apparatus of claim 26, wherein the guide is at least partially disposed within the vessel.

28. A processing apparatus comprising:
a vessel including an inner surface defining a chamber configured to hold a reaction mixture, wherein the vessel further includes a port configured to introduce the reaction mixture, including at least one reactant and at least one catalyst, to the chamber and to release at least one product with or without the at least one catalyst from the chamber;
a guide configured to propagate electromagnetic energy; and
a first dielectric projection and a second dielectric projection coupled to the guide and including a respective portion that extends into the chamber and is in contact with the reaction mixture, each of the first dielectric projection and the second dielectric projection being configured to couple a portion of the electromagnetic energy from the guide into the reaction mixture.

29. The apparatus of claim 28, wherein the guide includes a dielectric-filled waveguide, and wherein the first dielectric projection and the second dielectric projection are coupled to the dielectric-filled waveguide.

30. The apparatus of claim 29, wherein the apparatus further comprises a RF generator coupled to the dielectric-filled waveguide to propagate RF energy through the dielectric-filled waveguide.

31. The apparatus of claim 28, wherein the apparatus further comprises an electromagnetic generator, wherein the guide includes a first guide and a second guide coupled to the electromagnetic generator, wherein the first guide includes the first dielectric projection and the second guide includes the second dielectric projection.

32. The apparatus of claim 31, wherein the electromagnetic generator includes a first electromagnetic generator coupled to the first guide and a second electromagnetic generator coupled to the second guide.

33. The apparatus of claim 28, wherein the apparatus further comprises an electromagnetic generator and a distributor coupled to the electromagnetic generator, wherein the guide includes a first guide and a second guide, wherein the first guide includes the first dielectric projection and the second guide includes the second dielectric projection.

34. A processing apparatus comprising:
a vessel including an inner surface defining a chamber configured to hold a reaction mixture;
a first guide configured to propagate electromagnetic energy;
a first dielectric projection and a second dielectric projection coupled to the guide and at least partially disposed within the vessel, each of the first dielectric projection and the second dielectric projection being configured to couple a portion of the electromagnetic energy from the guide into the reaction mixture;
a second guide configured to propagate electromagnetic energy; and
a third dielectric projection and a fourth dielectric projection coupled to the guide and at least partially disposed within the vessel, each of the third dielectric projection and the fourth dielectric projection being configured to couple a portion of the electromagnetic energy from the second guide into the reaction mixture.

35. The apparatus of claim 28, wherein the guide is disposed outside of the vessel.

36. The apparatus of claim 28, wherein the guide is at least partially disposed within the vessel.

37. The apparatus of claim 28, further comprising a dielectric material at least partially surrounding the first dielectric projection.

38. The apparatus of claim 34, wherein the vessel further includes a port configured to introduce at least one reactant with or without at least one catalyst to the chamber and to release at least one product with or without at least one catalyst from the chamber.

39. The apparatus of claim 34, wherein the first guide and the second guide includes a first dielectric-filled waveguide and a second dielectric-filled wave guide, respectively, and wherein the first dielectric projection and the second dielectric projection are coupled to the first dielectric-filled waveguide, and the third dielectric projection and the fourth dielectric projection are coupled to the second dielectric-filled waveguide.

40. The apparatus of claim 34, wherein the electromagnetic generator includes a first electromagnetic generator coupled to the first guide and a second electromagnetic generator coupled to the second guide.

41. The apparatus of claim 34, wherein the apparatus further comprises an electromagnetic generator and a distributor coupled to the electromagnetic generator, wherein the first guide includes the first dielectric projection and the second guide includes the second dielectric projection.

42. The apparatus of claim 34, wherein the first guide and the second guide are disposed outside of the vessel.

43. The apparatus of claim 34, wherein the first guide is at least partially disposed within the vessel.

44. The apparatus of claim 34, wherein the first dielectric projection and the second dielectric projection are at least partially disposed into the chamber and in contact with the reaction mixture.

45. The apparatus of claim 1, wherein the guide includes a second portion that extends into the chamber and is in contact with the reaction mixture.

\* \* \* \* \*